(12) United States Patent
Androsyuk et al.

(10) Patent No.: US 12,086,662 B2
(45) Date of Patent: Sep. 10, 2024

(54) DUAL RIB COIN RESISTANT GATE FOR A PAYMENT INTERFACE

(71) Applicant: Crane Payment Innovations, Inc., Malvern, PA (US)

(72) Inventors: Sergiy Androsyuk, Toronto (CA); Matthew Sidell, Phoenixville, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 434 days.

(21) Appl. No.: 16/976,845

(22) PCT Filed: Aug. 22, 2019

(86) PCT No.: PCT/US2019/047700
§ 371 (c)(1),
(2) Date: Aug. 31, 2020

(87) PCT Pub. No.: WO2020/041586
PCT Pub. Date: Feb. 27, 2020

(65) Prior Publication Data
US 2020/0410306 A1    Dec. 31, 2020

Related U.S. Application Data

(60) Provisional application No. 62/722,104, filed on Aug. 23, 2018.

(51) Int. Cl.
*G06K 13/08* (2006.01)
*G06K 19/04* (2006.01)
*G06Q 20/34* (2012.01)

(52) U.S. Cl.
CPC ..... *G06K 13/0875* (2013.01); *G06K 13/0887* (2013.01); *G06K 19/042* (2013.01); *G06Q 20/34* (2013.01)

(58) Field of Classification Search
CPC .......................... G06K 13/0875; G06Q 20/34
See application file for complete search history.

(56) References Cited

U.S. PATENT DOCUMENTS 3,766,687 A    10/1973  Henson
5,272,326 A    12/1993  Fujita et al.
(Continued)

FOREIGN PATENT DOCUMENTS

EP    1018693 A2      7/2000
JP    2000293636 A  * 10/2000

OTHER PUBLICATIONS

Supplementary European Search Report dated May 3, 2022, in connection with European Application No. 19852672.5, 4 pages.
(Continued)

*Primary Examiner* — Christle I Marshall

(57) ABSTRACT

The present disclosure relates to a coin resistant gate (114) for a payment interface (102). The coin resistant gate comprises a body (502) moveably connected within the payment interface (102), a front surface (804) connected to the body (502), the front surface (804) operable to prevent objects from entering the payment interface (102), and, two or more protruding members (302) connected to the front surface (804), the two or more protruding members (302) for interacting with a payment card (402), wherein, upon an interaction between the two or more protruding members (302) and the payment card (402), the body (502) moves to allow the payment card (402) to pass the front surface (804) of the body (502) of the coin resistant gate (114).

13 Claims, 30 Drawing Sheets

(56) References Cited

U.S. PATENT DOCUMENTS

| | | | |
|---|---|---|---|
| 5,557,089 | A | 9/1996 | Hall et al. |
| 5,905,252 | A | 5/1999 | Magana |
| 6,186,401 | B1 * | 2/2001 | Magana ................. G06K 13/08 235/475 |
| 6,527,187 | B1 | 3/2003 | Nagata et al. |
| 6,641,034 | B1 * | 11/2003 | Oki ........................ G06K 13/08 235/491 |
| 8,496,182 | B2 * | 7/2013 | Mizawa ............. G06K 13/0875 235/382 |
| 8,875,994 | B2 | 11/2014 | Theobald |
| 9,747,530 | B2 | 8/2017 | Goh |
| 9,792,536 | B2 * | 10/2017 | Carmine ................ G06K 13/06 |
| 10,007,869 | B2 | 6/2018 | Goh |
| 10,026,025 | B2 * | 7/2018 | Aiyoshi ............... G06K 7/0021 |
| 2004/0007620 | A1 * | 1/2004 | Hirasawa ............... G06K 13/08 235/449 |
| 2011/0006118 | A1 * | 1/2011 | Mizawa ............. G06K 13/0875 235/483 |

OTHER PUBLICATIONS

Communication pursuant to Article 94(3) EPC dated May 13, 2022, in connection with European Application No. 19852672.5, 6 pages.
International Search Report and Written Opinion of the International Searching Authority in connection with International Application No. PCT/US2019/047700 dated Nov. 19, 2019, 7 pages.

* cited by examiner

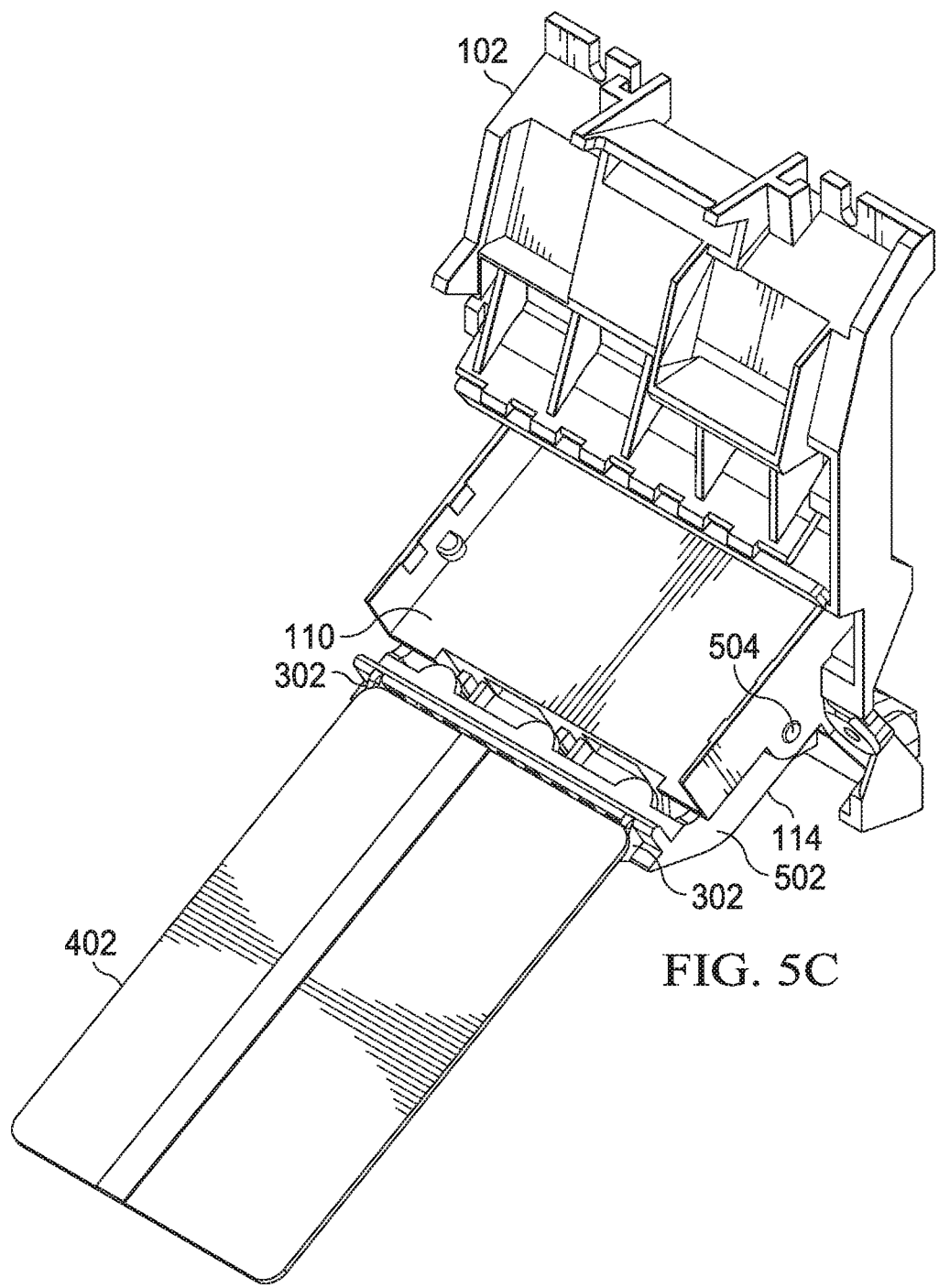

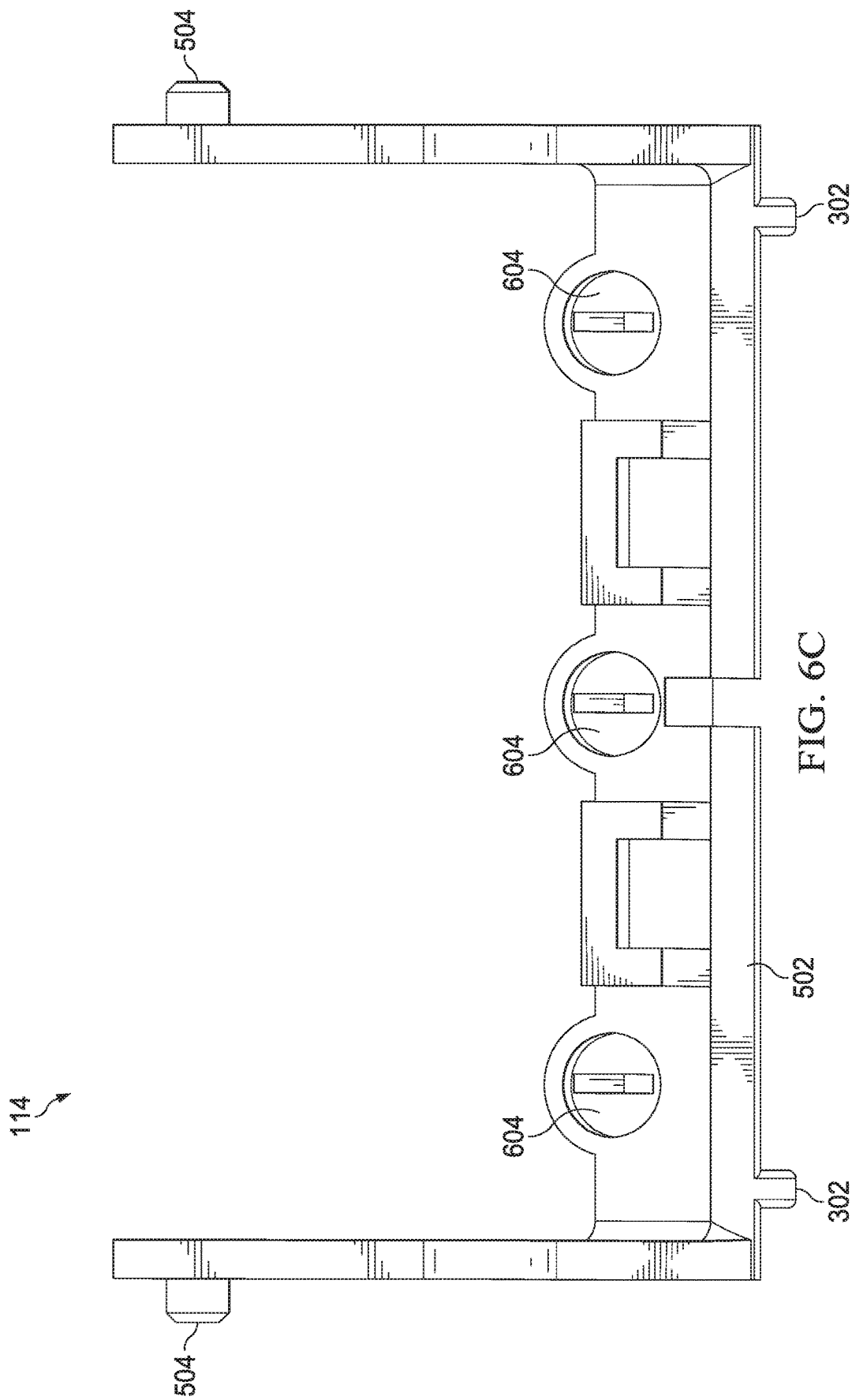

DUAL RIB COIN RESISTANT GATE FOR A PAYMENT INTERFACE

CROSS-REFERENCE TO RELATED APPLICATIONS

This application is a 371 National Stage of International Application No. PCT/US2019/047700, filed Aug. 22, 2019, which claims the benefit of Provisional Application No. 62/722,104, filed Aug. 23, 2018, the disclosures of which are herein incorporated by reference in their entirety.

TECHNICAL FIELD

This disclosure is generally directed to automated payment systems. More specifically, this disclosure is directed to a dual rib coin resistant gate for a payment interface.

SUMMARY

This disclosure provides a dual rib coin resistant gate for a payment interface.

In one aspect thereof, a coin resistant gate for a payment interface includes a body moveably connected within the payment interface. The coin resistant gate further includes a front surface connected to the body, the front surface operable to prevent objects from entering the payment interface. The coin resistant gate further includes two or more protruding members connected to the front surface, the two or more protruding members for interacting with a payment card, wherein, upon an interaction between the two or more protruding members and a payment card, the body moves to allow the payment card to pass the front surface of the body of the coin resistant gate.

Other technical features may be readily apparent to one skilled in the art from the following figures, descriptions, and claims.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 5C illustrates a top perspective view of a coin resistant gate coming into contact with a payment card in accordance with embodiments of the present disclosure;

FIG. 6C illustrates a top view of a coin resistant gate showing elastic member locations in accordance with embodiments of the present disclosure;

Figure 1A:
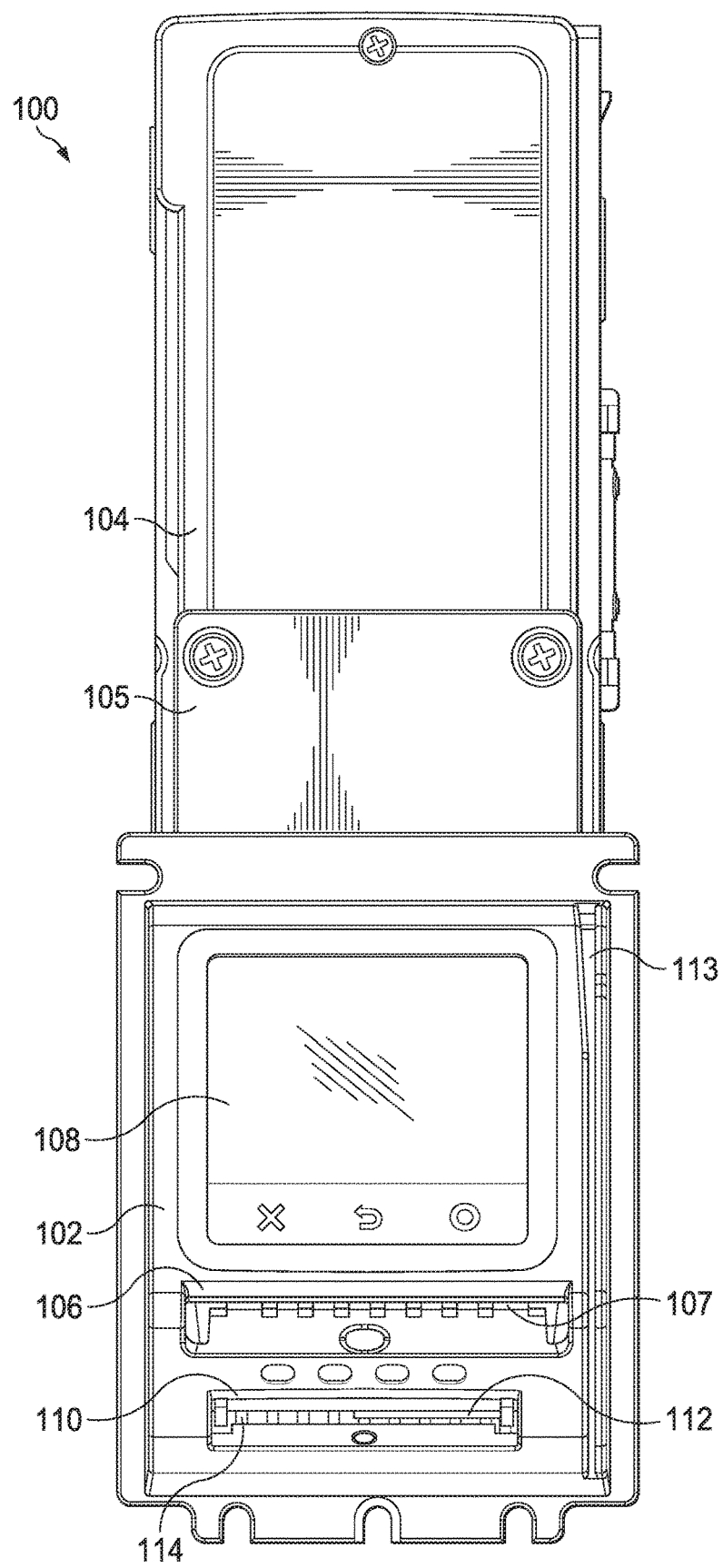
FIG. 1A illustrates a front view of a currency handling apparatus according to embodiments of the present disclosure.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of non-volatile/memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

FIGS. 1A through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged payment apparatus.

As used throughout this specification, the terms currency denomination, denomination of currency, valuable document, currency bill, bill, banknote, note, bank check, paper money, paper currency, and cash may be used interchangeably herein to refer to a type of a negotiable instrument or any other writing that evidences a right to the payment of a monetary obligation, typically issued by a central banking authority. As used throughout this specification, the terms coin, slug, token, and washer, valuable token may be used interchangeably herein to refer to a type of a negotiable instrument or any other writing that evidences a right to the payment of a monetary obligation, typically issued by a central banking authority.

Coin resistant gates have featured a single insertion activation rib. This means that having a card on the side away from the rib will not cause the gate to activate. Coin resistant gates have also been designed in a vertical orientation which limits design capabilities. Such coin resistant gates also were made in solid opaque materials and would not allow light to pass through the gate. Even if molded in a clear material, the design geometry was not optimized to disperse light. Also, previous coin resistant gates were placed deep inside the bezel. This meant that even if a coin did not cause the gate to lower, it could still be jammed.

Figure 1B:
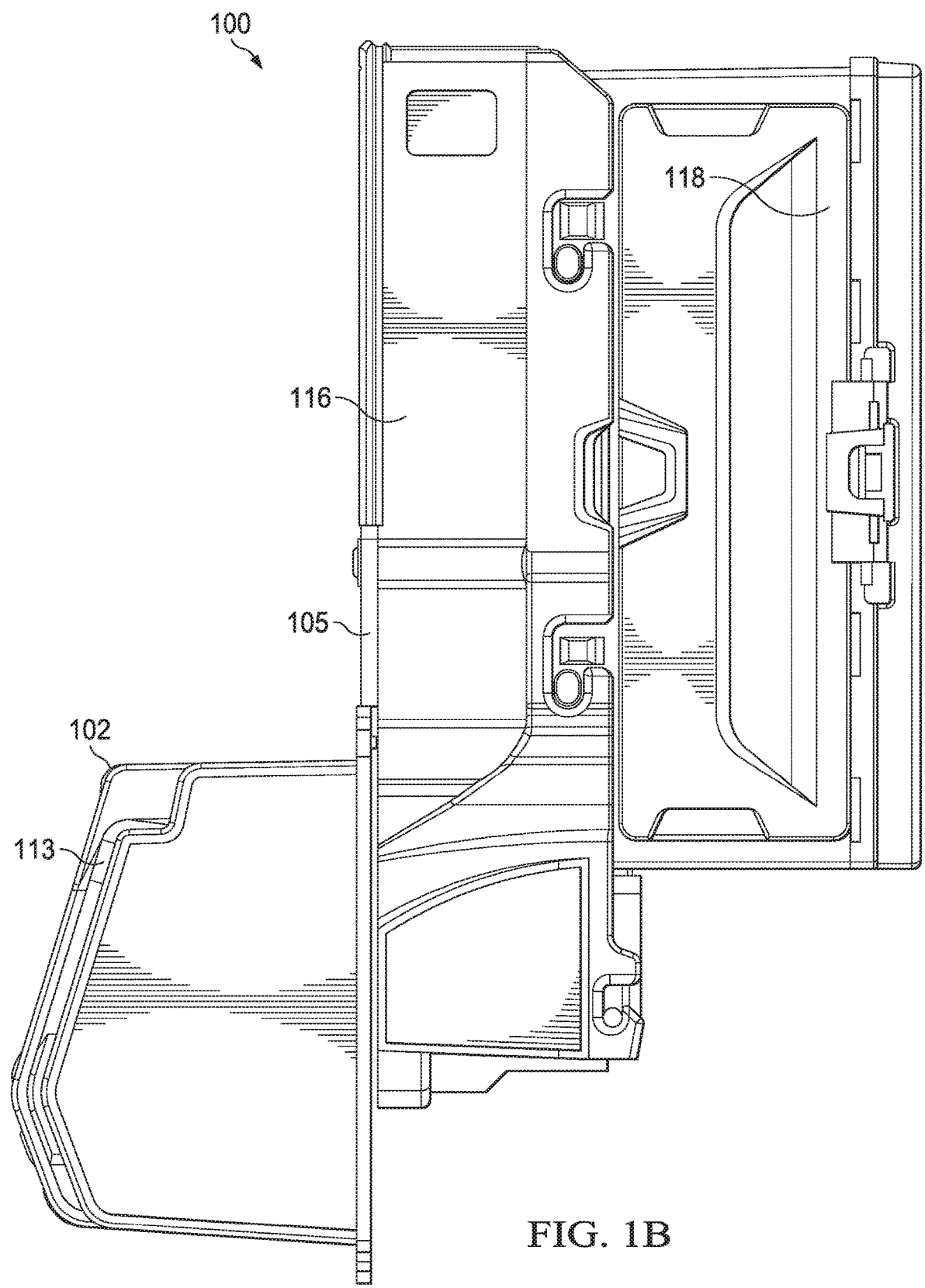
FIG. 1B illustrates a side view of a currency handling apparatus according to embodiments of the present disclosure.
Figure 1C:
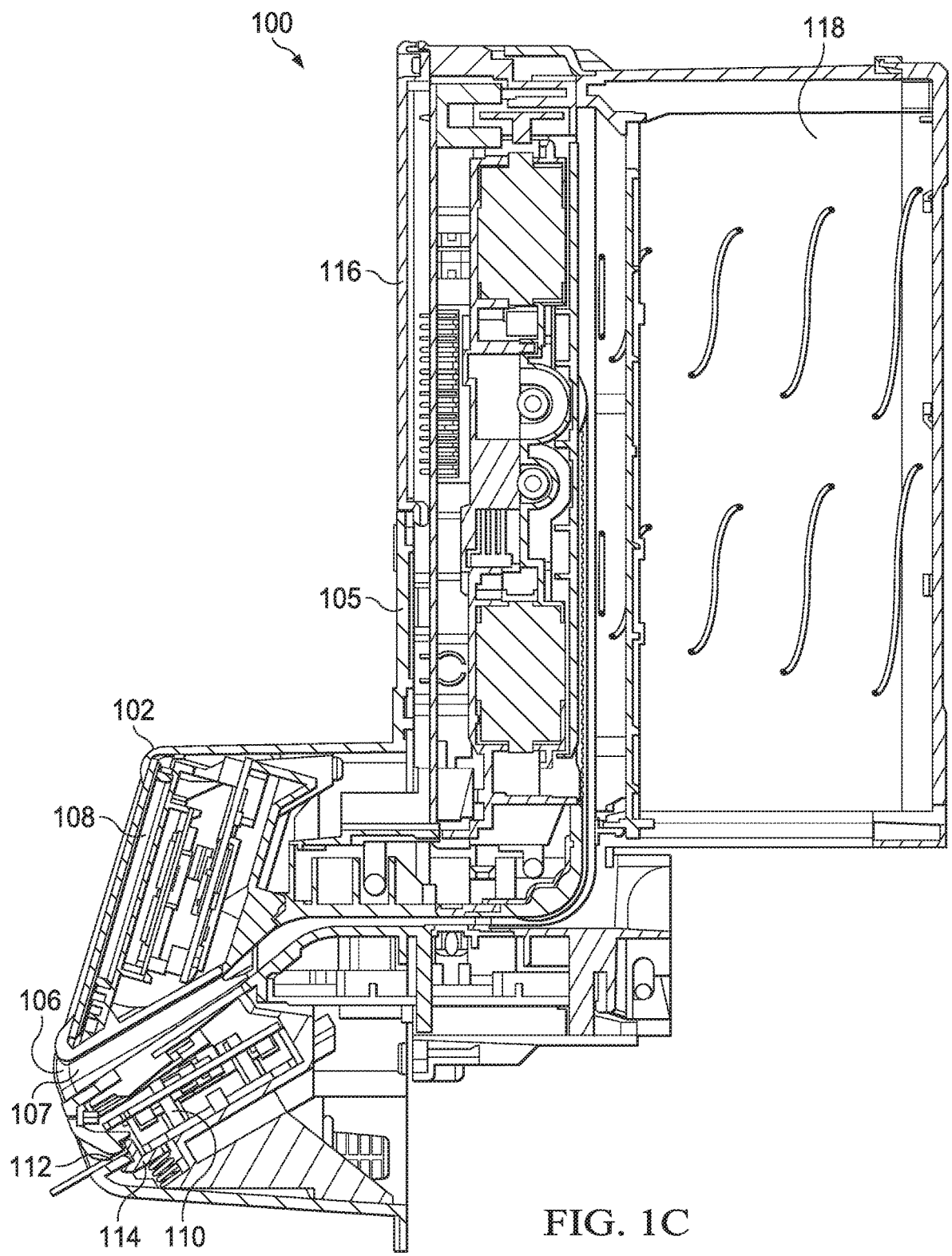
FIG. 1C illustrates a side cross-sectional view of a currency handling apparatus showing an internal structure of a currency handling apparatus according to embodiments of the present disclosure.

FIGS. 1A-1C illustrate examples of a currency handling apparatus 100 according to embodiments of this disclosure. FIG. 1A illustrates a front view of the currency handling apparatus 100 according to embodiments of the present disclosure. FIG. 1B illustrates a side view of the currency handling apparatus 100 according to embodiments of the present disclosure. FIG. 1C illustrates a side cross-sectional view of the currency handling apparatus 100 showing the internal structure of the currency handling apparatus according to embodiments of the present disclosure. Currency handling apparatuses come in a wide variety of configurations, and FIGS. 1A-1C do not limit the scope of this disclosure to any particular implementation of a currency handling apparatus.

The currency handling apparatus 100 includes a payment interface or payment bezel 102 coupled to the front of a chassis 104 of the currency handling apparatus 100. In some embodiments, the payment bezel 102 includes a back plate 105 for attachment to the chassis 104 via one or more fixation devices. The payment bezel 102 includes on a front face thereof a screen 108 for providing user interaction. The screen 108 can be a touchscreen that presents product choices and payment instructions and options to users. A user can use the screen 108 to make product selections, choose payment options, enter information such as a personal identification number (PIN) used for authenticating payment, view information such as payment instructions, or perform other actions. The payment bezel 102 further includes below the screen 108 an interface slot for the banknote acceptor 106. The banknote acceptor 106 is operable to receive banknotes inserted into the banknote slot 107 of the banknote acceptor 106. Upon receiving a banknote into the banknote slot 107, the banknote is carried through the currency handling apparatus 100 to store the banknote. In some embodiments, the banknote acceptor may also dispense banknotes to a user as change as a result of an overpayment during a transaction.

The payment bezel also includes a card chip reader 110 having a card slot 112 into which a payment card such as a debit card, a credit card, a gift card, or other type of card can be inserted as one payment means. As will be further described herein, the card slot 112 includes a coin resistant gate 114 to prevent coins from being mistakenly inserted into the card slot. In some embodiments, the payment bezel includes on a side thereof a magnetic card stripe reader 113 for allowing a user to swipe a payment card such as a credit card or debit card to complete a purchase or other transaction. In other embodiments, the payment bezel can include a magnetic card stripe reader 113 on the other side of the bezel, or may not include a magnetic card stripe reader. The magnetic card stripe reader 113 can be used when the card chip reader 110 is not available, such as if the card chip reader 110 is damaged, if a user's card includes a magnetic stripe, but does not include a chip, or in other situations in which the card chip reader 110 cannot be used. In some embodiments, a user can be given an option by the payment bezel 102 to use either the card chip reader 110 or the magnetic card stripe reader 113.

The currency handling apparatus 100 further includes, coupled to or integrated with the chassis 104, a banknote validator 116 and a removable storage unit 118. The banknote validator 116 can be configured to receive a banknote and transport the currency item past a sensing component to determine the type and validity of the currency item. In one or more embodiments, the removable storage unit 118 can be a banknote stack recycler. In some implementations, the removable storage unit 118 includes a transportation device for transporting banknotes to and/or from the removable storage unit 118. In some embodiments, the currency handling apparatus 100 may not include a stacker. In some embodiments, a banknote recycling module can be added in addition to the removable storage unit.

Although FIGS. 1A-1C illustrate one example of a currency handling apparatus, various changes may be made to FIGS. 1A-1C. For example, the currency handling apparatus could be used in automatic ticket seller machines, automatic teller machines, vending machines and other kiosks. Also, there could be more than one removable storage unit as well as a temporary storage unit, such as a banknote recycler.

Figure 2A:
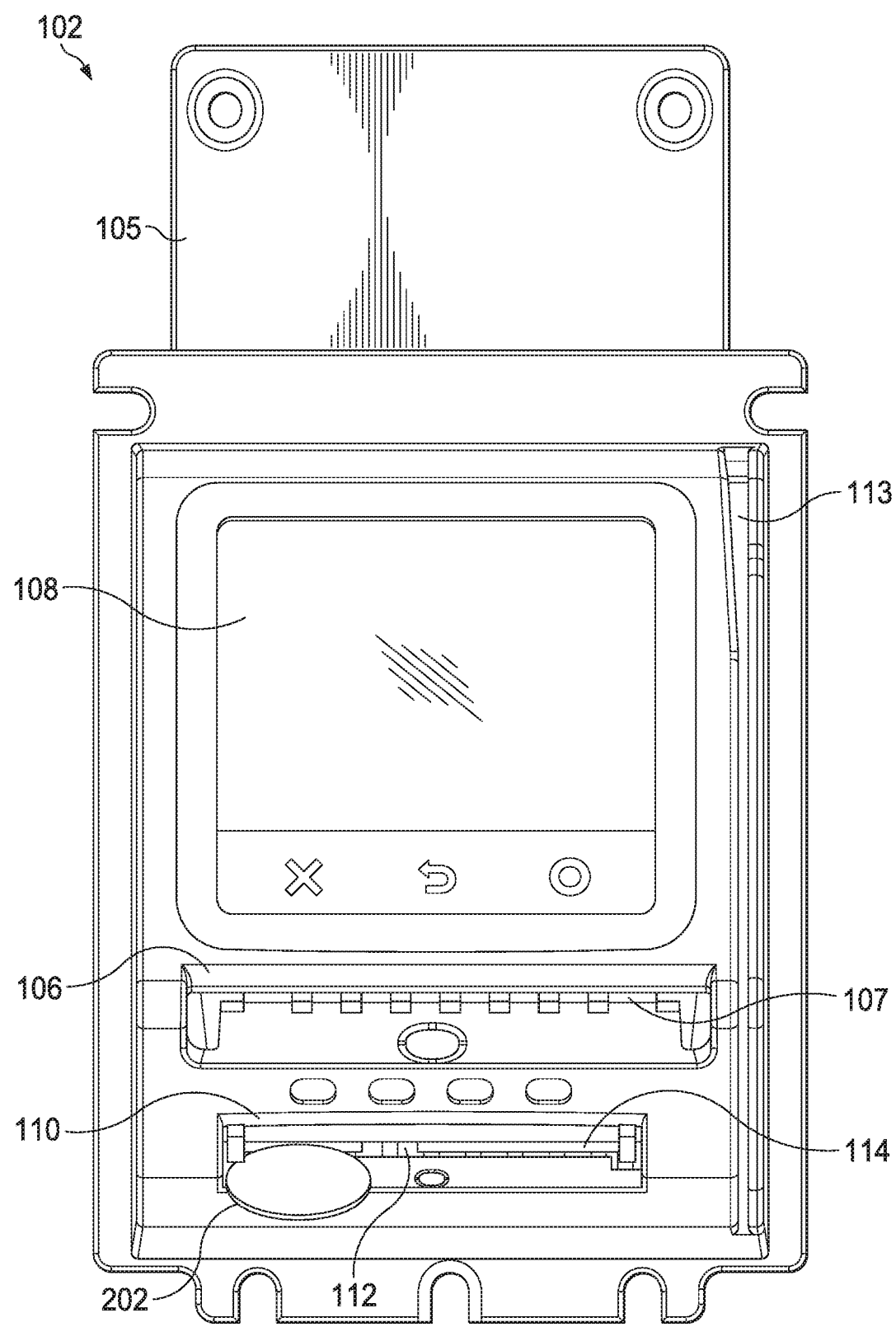
FIG. 2A is a front view of a payment bezel in accordance with embodiments of the present disclosure.
Figure 2B:
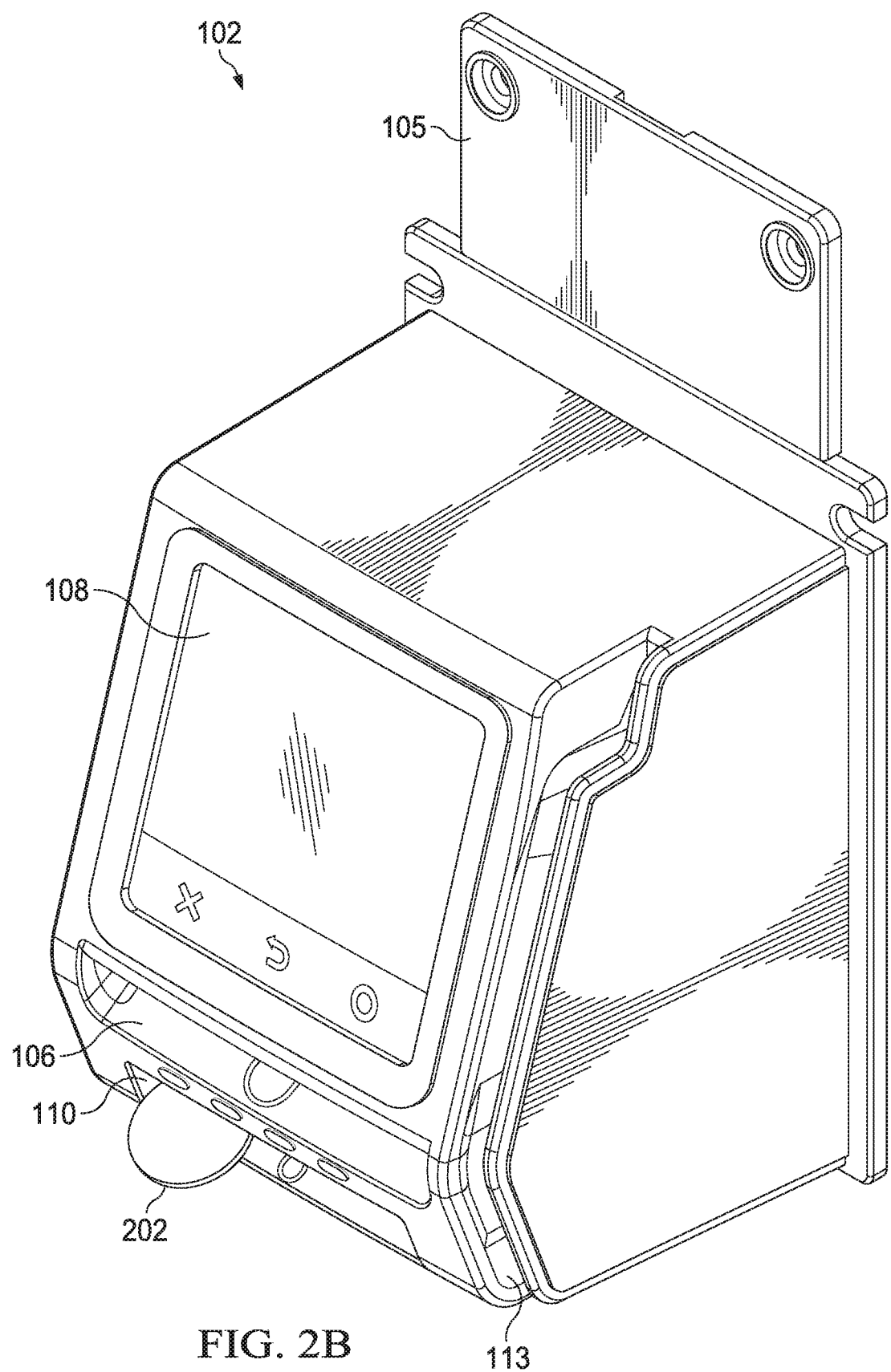
FIG. 2B is a side perspective view of a payment bezel in accordance with embodiments of the present disclosure.
Figure 2C:
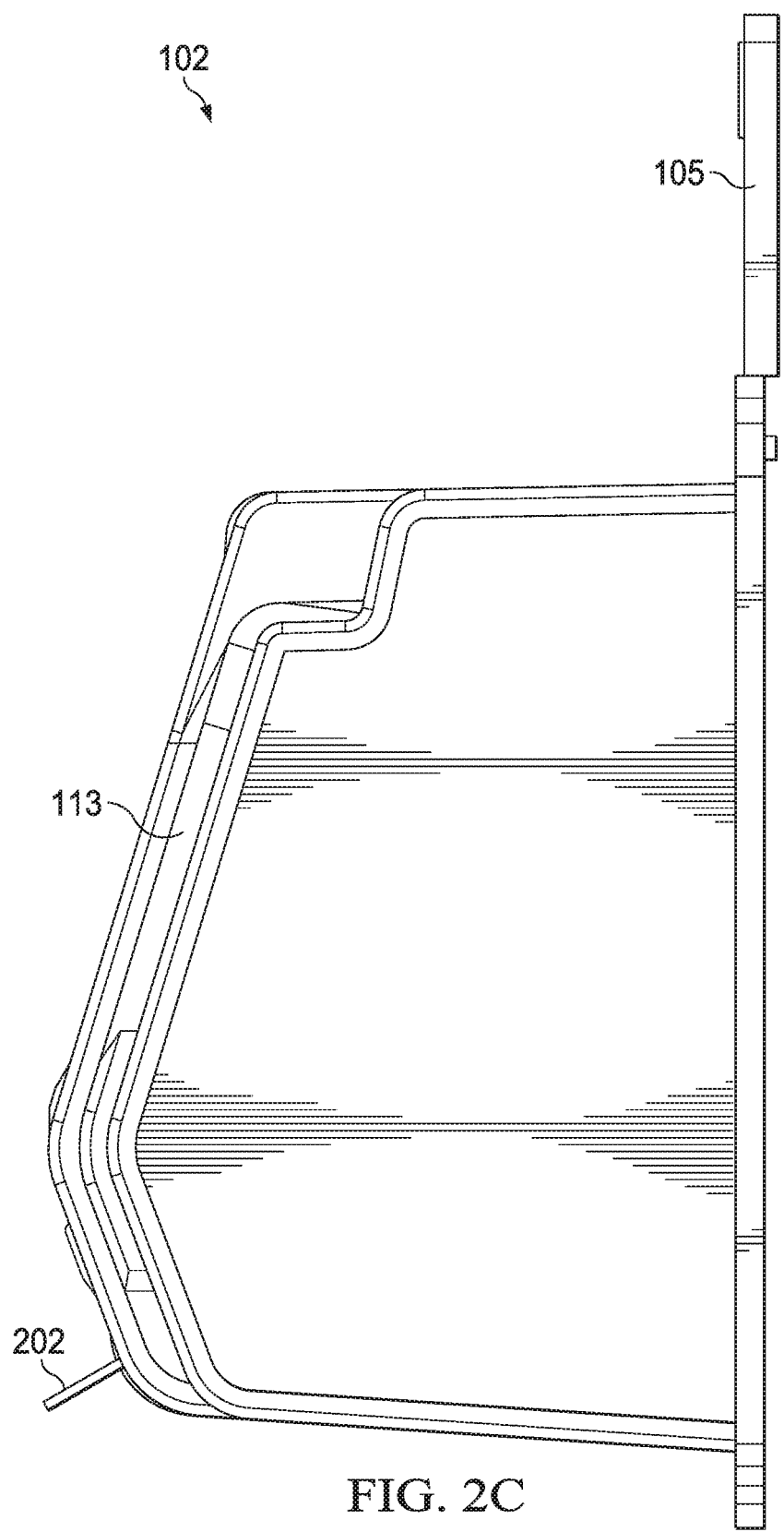
FIG. 2C is a side view of a payment bezel in accordance with embodiments of the present disclosure.
Figure 2D:
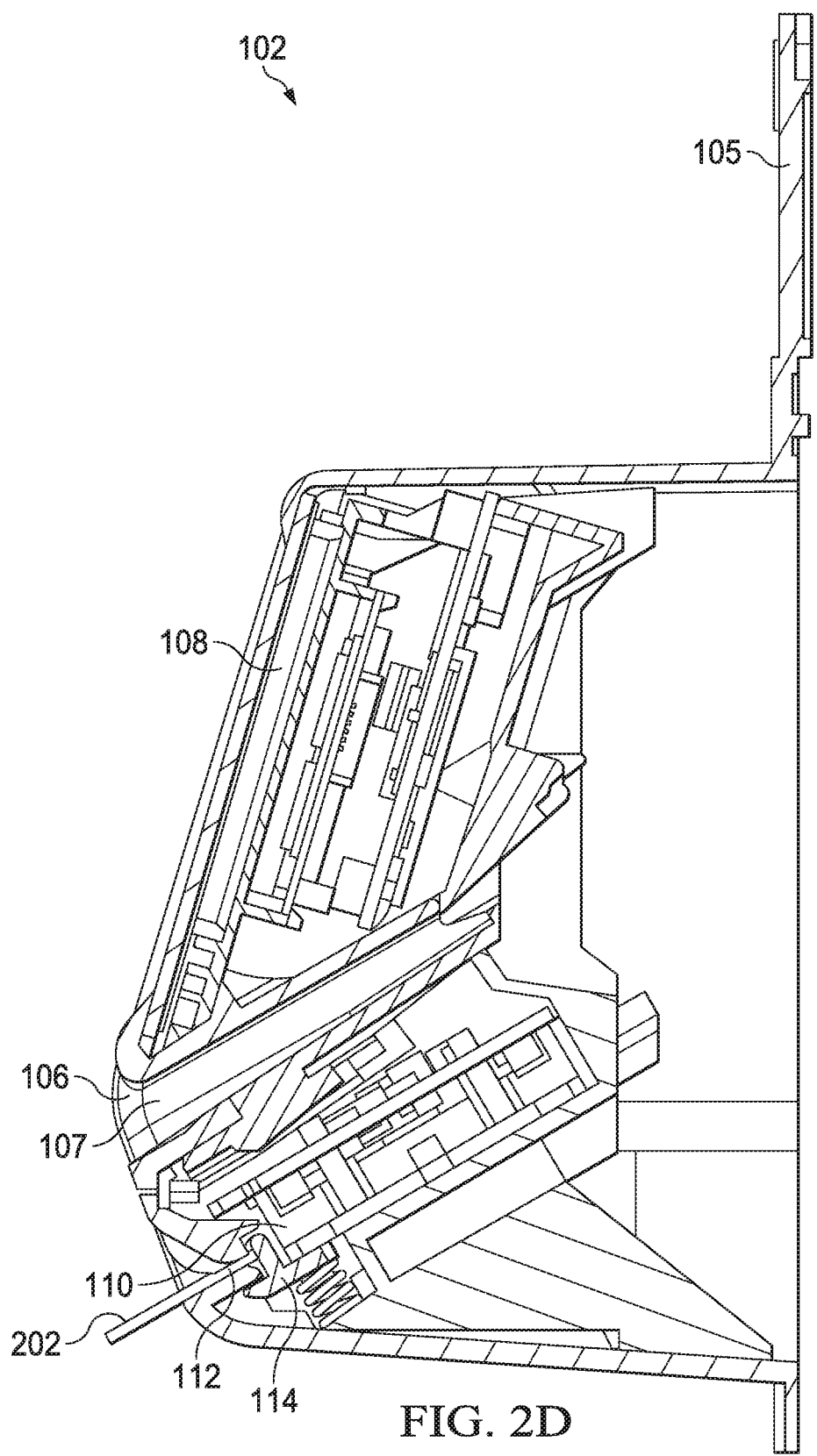
FIG. 2D is a side cross-sectional view of a payment bezel showing internal components of a payment bezel in accordance with embodiments of the present disclosure.

FIGS. 2A-2D illustrate various views of the payment bezel 102 separated from the chassis 104 in accordance with embodiments of the present disclosure. FIG. 2A is a front view of the payment bezel 102 in accordance with embodiments of the present disclosure. FIG. 2B is a side perspective view of the payment bezel 102 in accordance with embodiments of the present disclosure. FIG. 2C is a side view of the payment bezel 102 in accordance with embodiments of the present disclosure. FIG. 2D is a side cross-sectional view of the payment bezel 102 showing internal components of the payment bezel in accordance with embodiments of the present disclosure. Payment bezels can come in a wide variety of configurations, and FIGS. 2A-2D do not limit the scope of this disclosure to any particular implementation of a payment bezel.

The card chip reader 110 including the card slot 112 is configured to receive a payment card such as a credit card, a debit card, or another type of card into the card chip reader to complete a purchase or other transaction. It is becoming increasingly common for payment cards to include an integrated circuit, or chip, for storing card data that would in the past be stored on a magnetic stripe of a card. Payment cards that include a chip are physically inserted in a card reader to interface with contacts in the card reader in order to read the data from the payment card. Some chips on payment cards may also allow for near-field communications.

The card chip reader 110 further includes within the card slot 112 the coin resistant gate 114. The coin resistant gate 114 allows for a payment card to be inserted into the card slot, while preventing coins, or other objects, from being inserted into the card slot. In some cases, the credit card entry area may be mistaken for a coin insertion slot, causing users to attempt to insert coins or other objects into the card slot. The example illustrated in FIG. 2D shows that, when an attempt is made to insert a coin 202 into the card slot 112, the coin resistant gate 114 remains in a closed position, preventing the coin 202 from entering the card slot 212. The coin resistant gate 114 can prevent objects other than coins from being inserted into the card slot 112 as well, such as keys or other objects. The coin resistant gate 114 can thus prevent damage to the card chip reader 110, prevent objects from jamming the card slot 112 of the card chip reader 110, prevent certain fraudulent attempts at using the card chip reader 110, and can otherwise prevent any other tampering with the card chip reader 110.

Figure 3A:
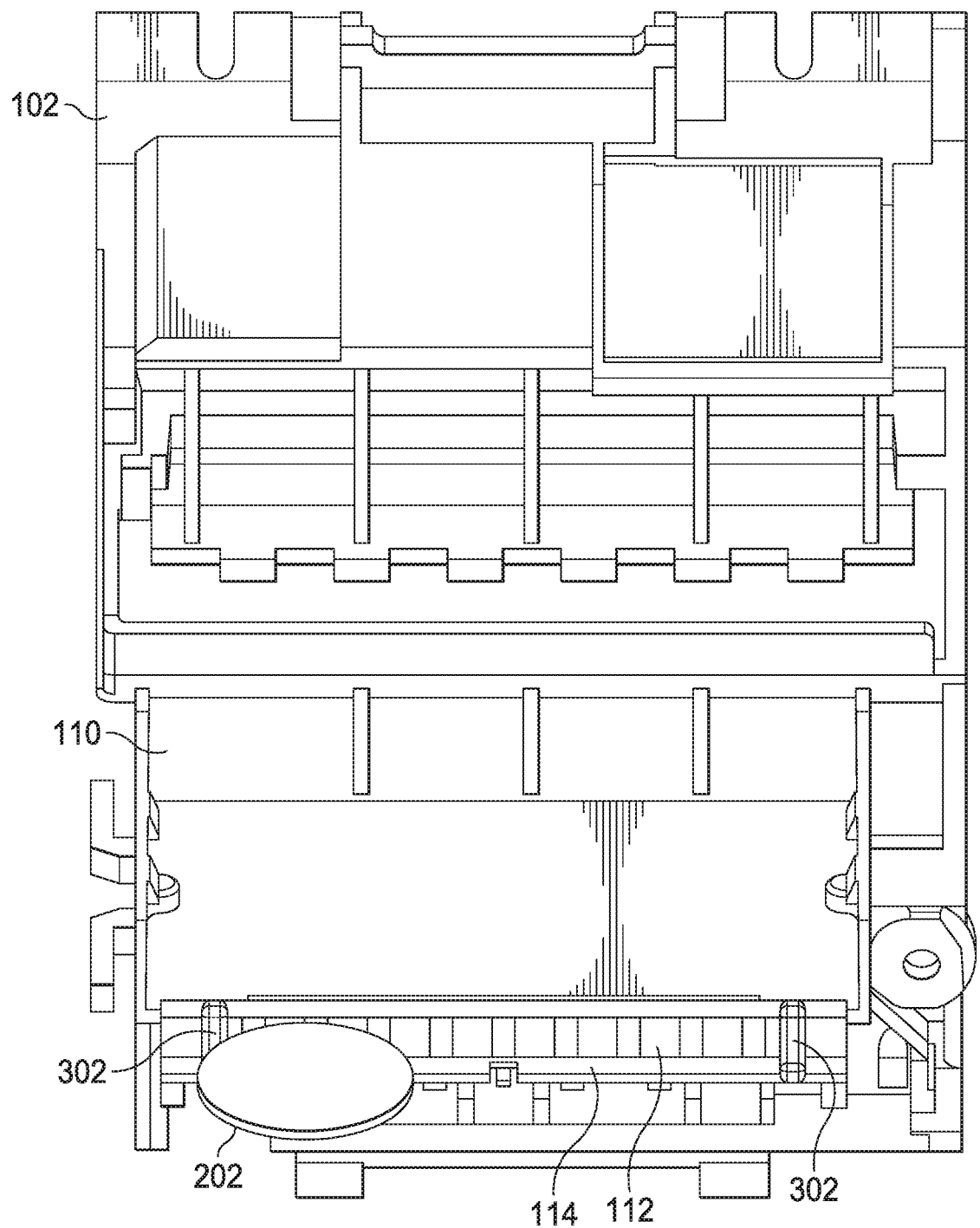
FIG. 3A illustrates a front view of a coin resistant gate coupled to a card chip reader in accordance with embodiments of the present disclosure.
Figure 3B:
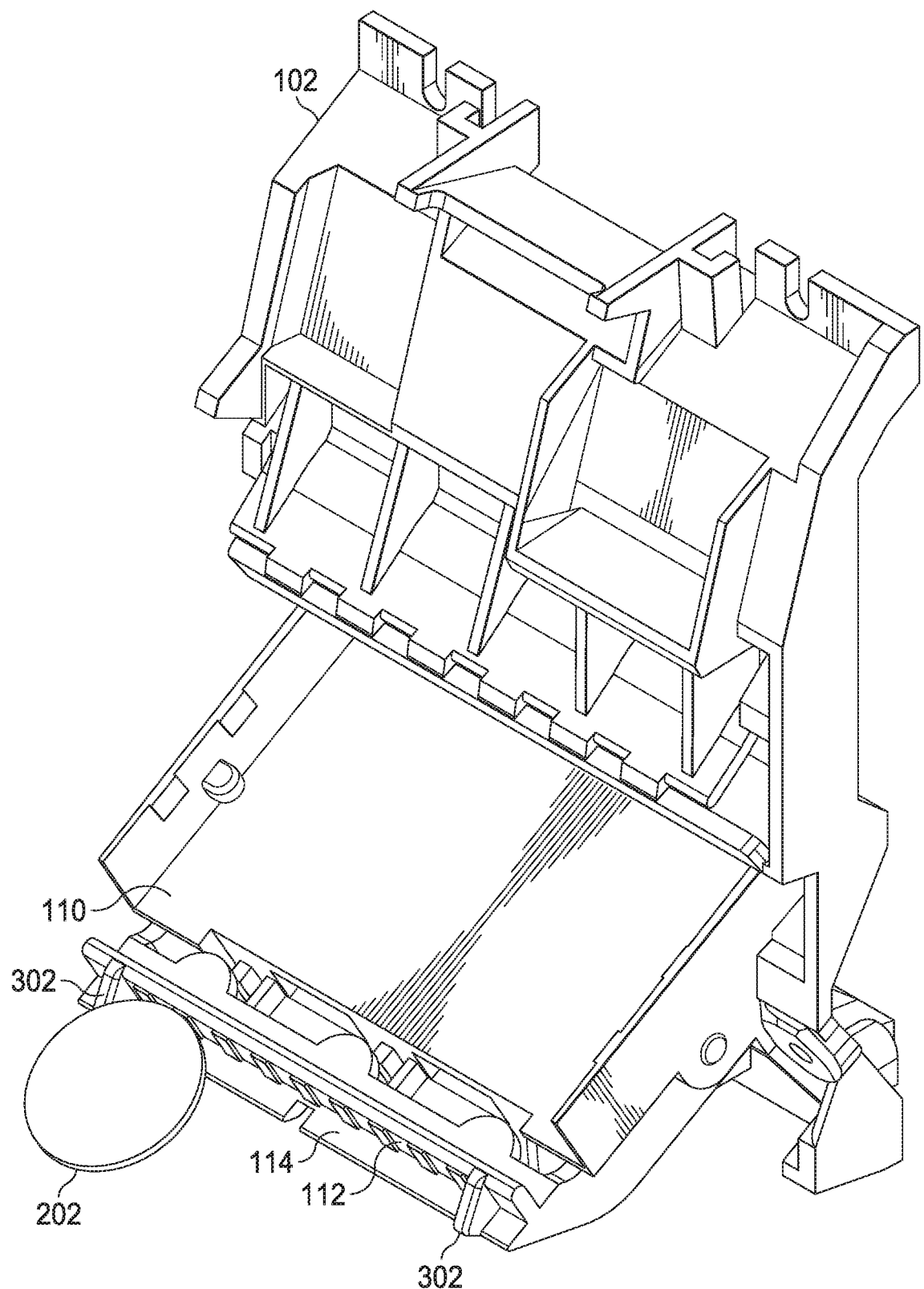
FIG. 3B illustrates a side perspective view of a coin resistant gate coupled to a card chip reader in accordance with embodiments of the present disclosure.
Figure 3C:
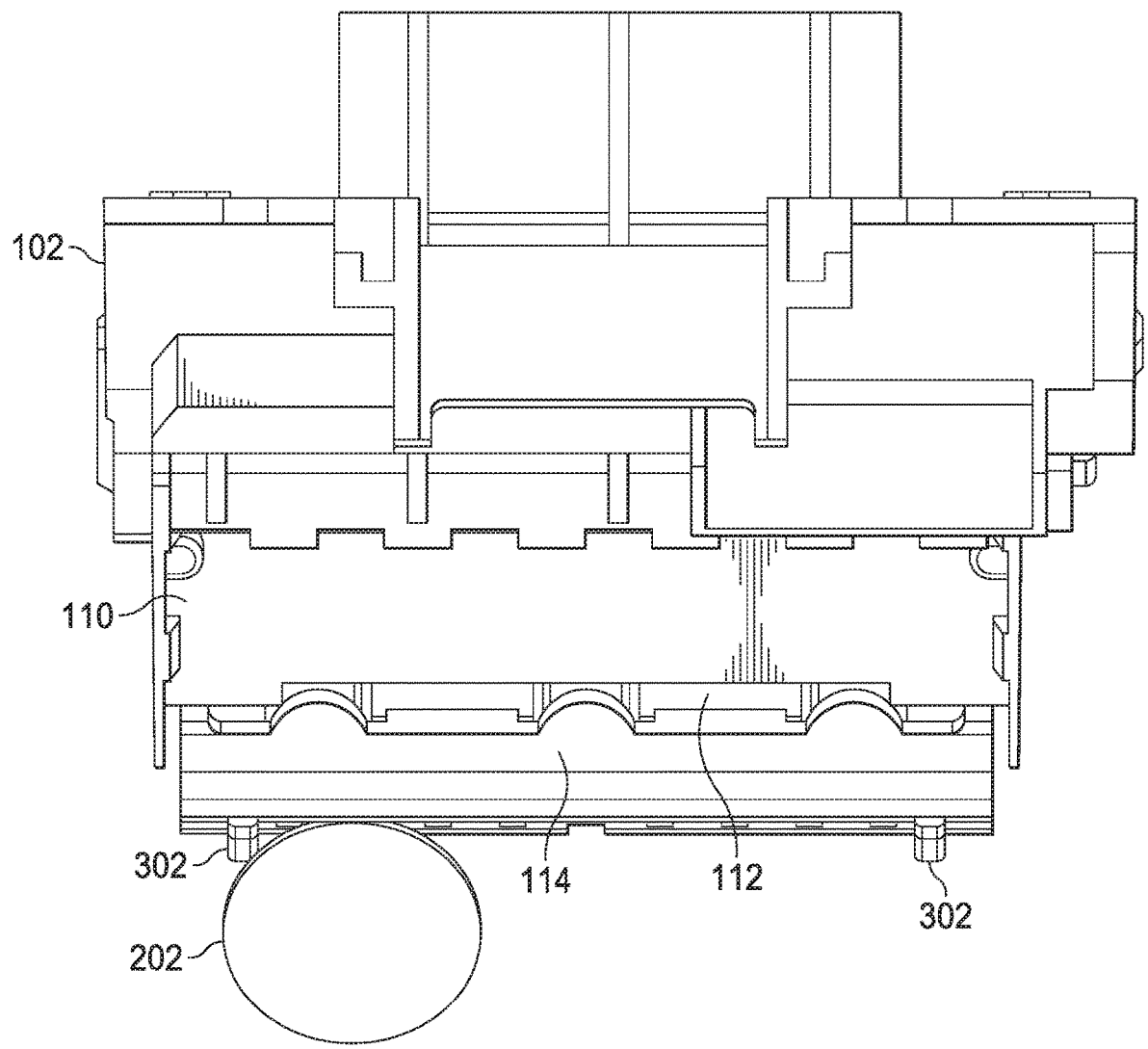
FIG. 3C illustrates a top perspective view of a coin resistant gate coupled to a card chip reader in accordance with embodiments of the present disclosure.
Figure 3D:
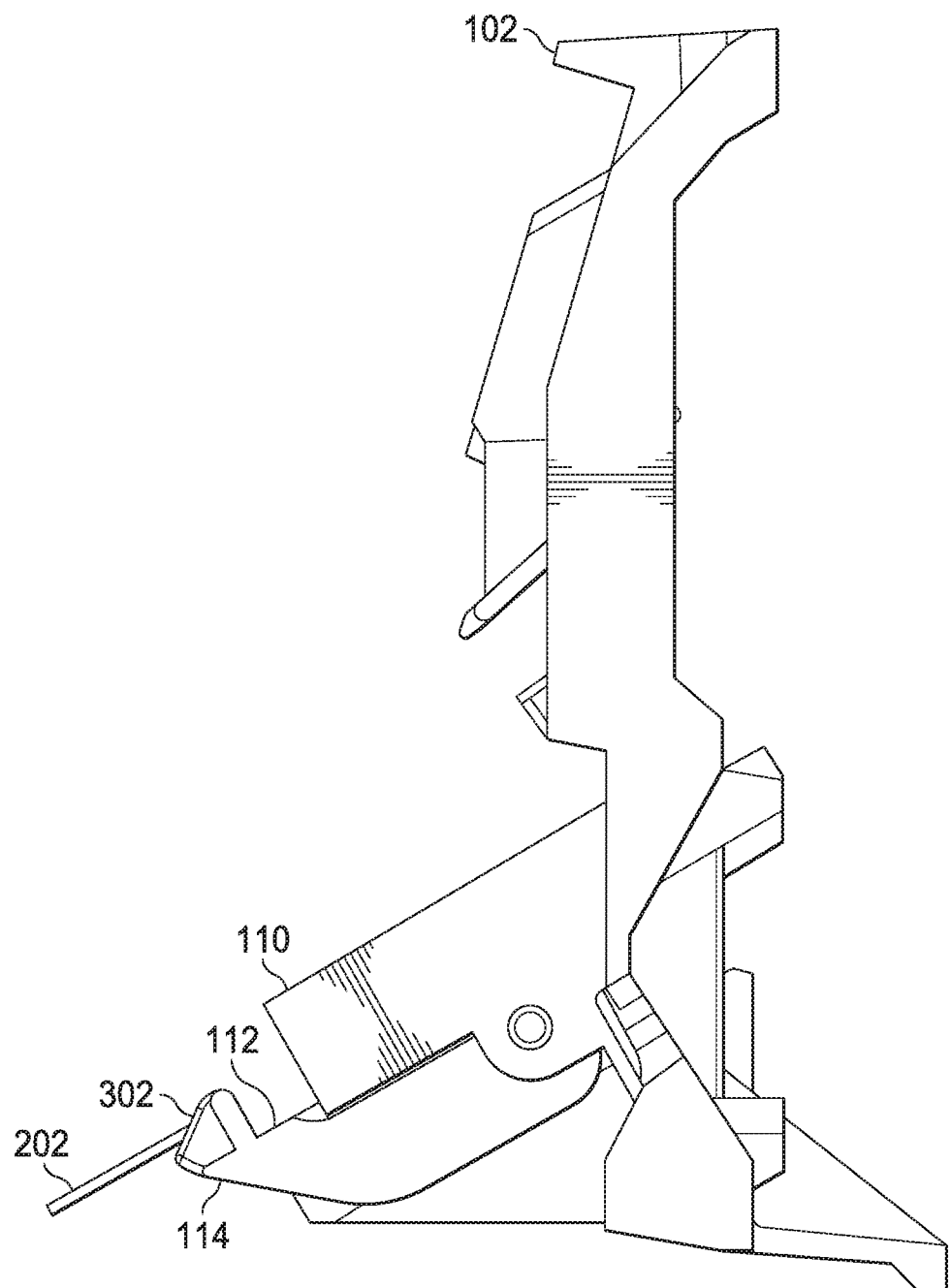
FIG. 3D illustrates a side view of a coin resistant gate coupled to a card chip reader in accordance with embodiments of the present disclosure.
Figure 3E:
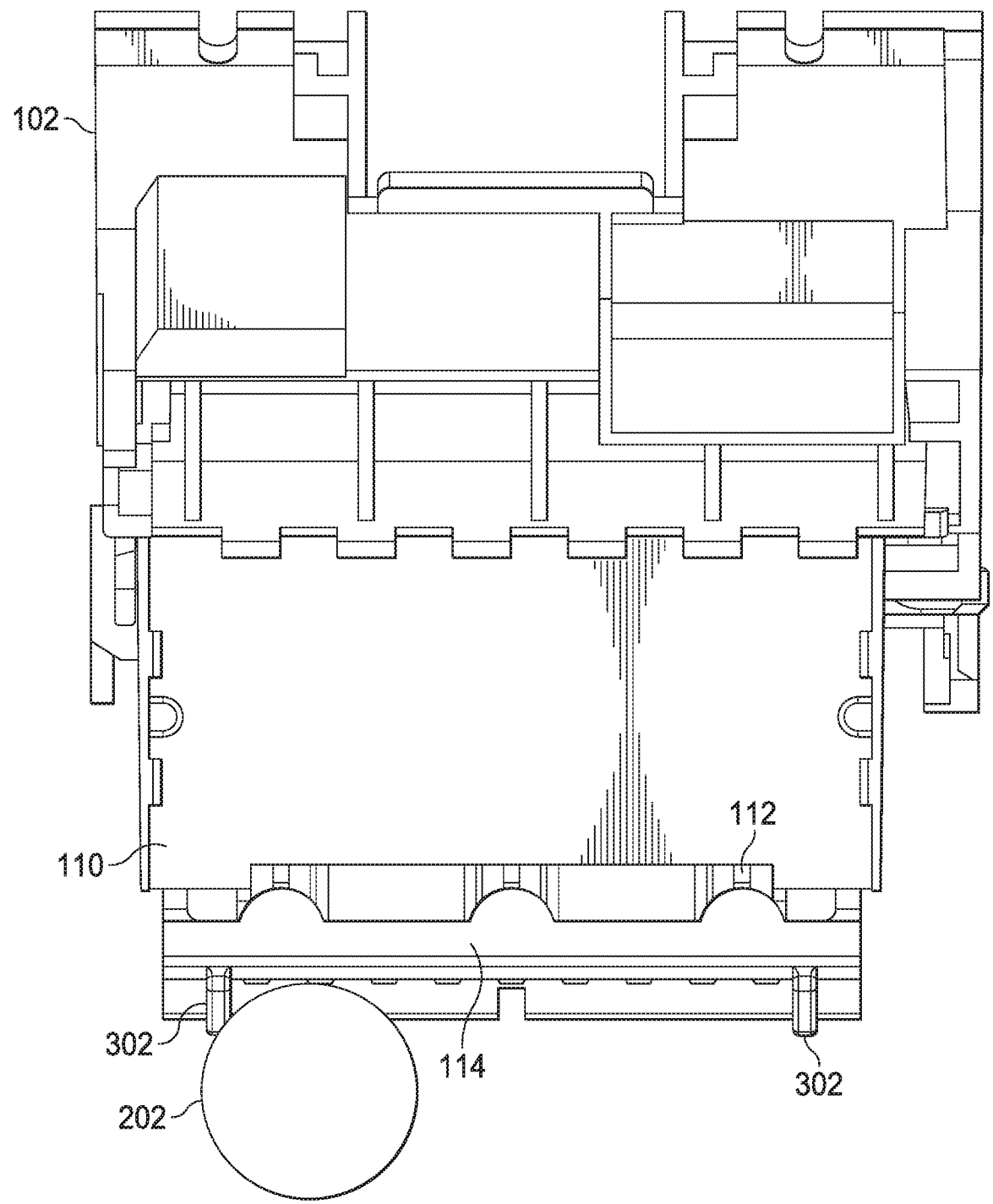
FIG. 3E illustrates a front perspective view of a coin resistant gate coupled to a card chip reader in accordance with embodiments of the present disclosure.
Figure 3F:
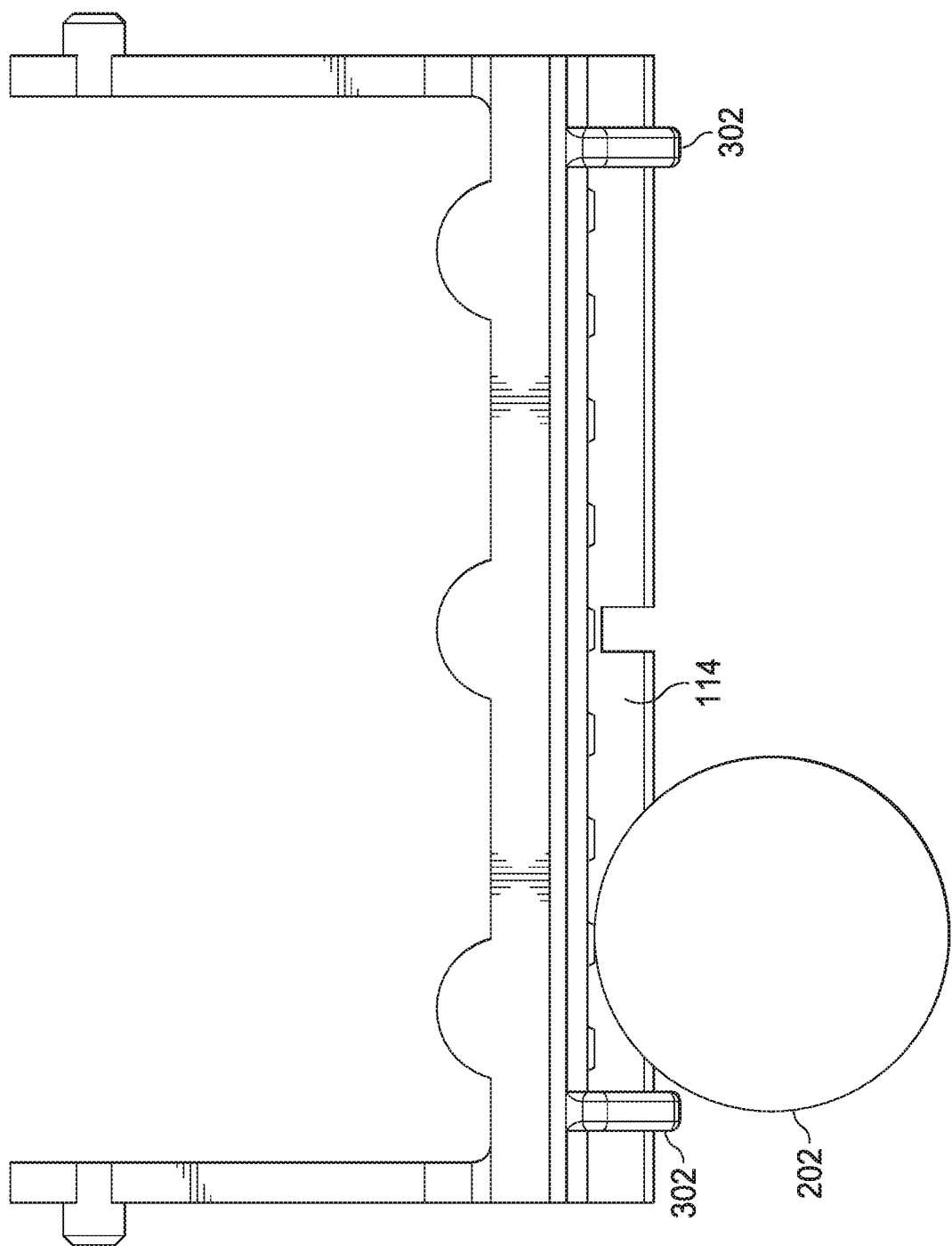
FIG. 3F illustrates a top view of a coin resistant gate separate from a card chip reader in accordance with embodiments of the present disclosure.
Figure 3G:
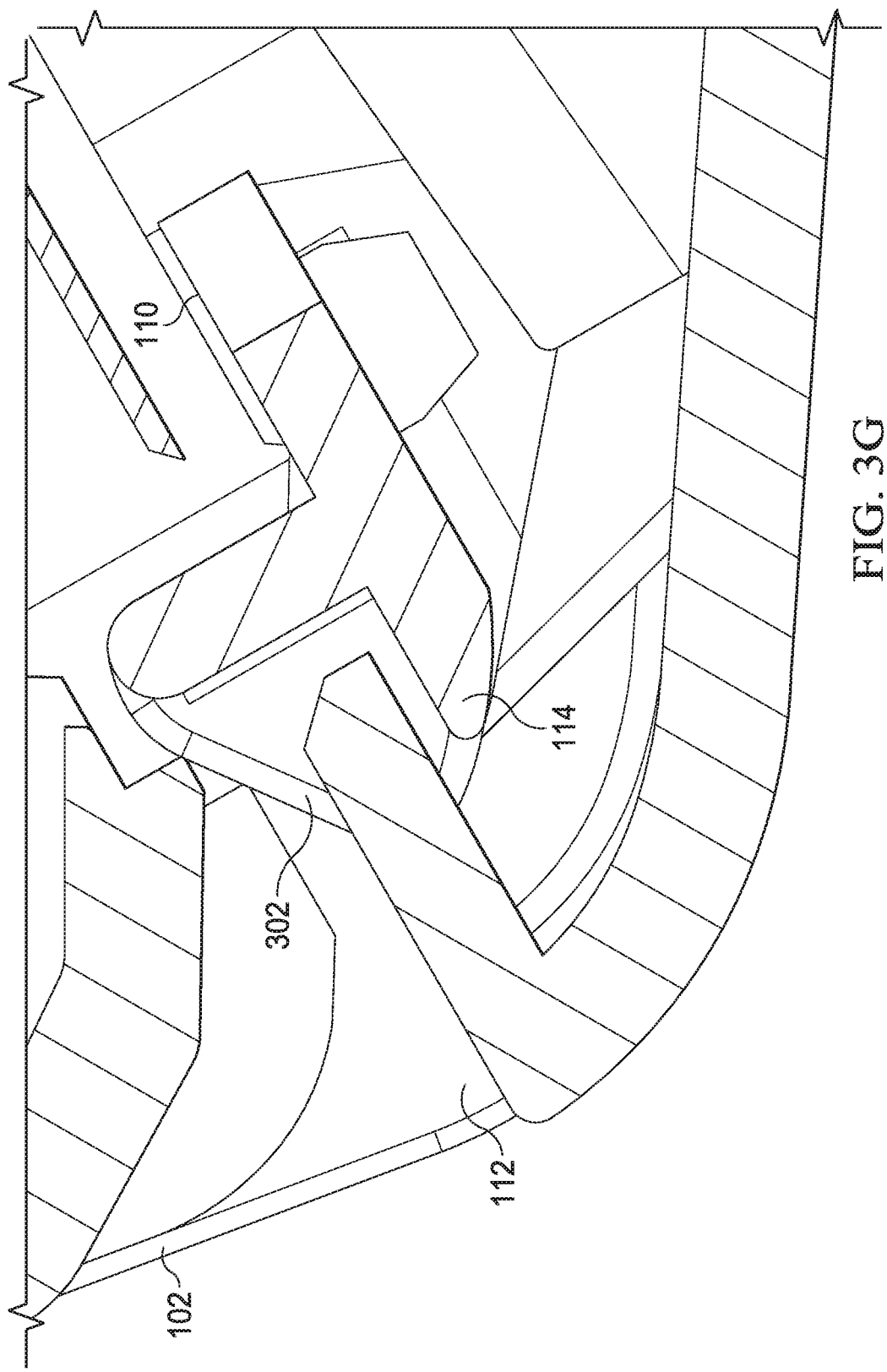
FIG. 3G illustrates a side view of a coin resistant gate including an activation rib in accordance with embodiments of the present disclosure.

FIGS. 3A-3G illustrate various views of the coin resistant gate 114 coupled to the card chip reader 110 in accordance with embodiments of the present disclosure. FIG. 3A illustrates a front view of the coin resistant gate 114 coupled to the card chip reader 110 in accordance with embodiments of the present disclosure. FIG. 3B illustrates a side perspective view of the coin resistant gate 114 coupled to the card chip reader 110 in accordance with embodiments of the present disclosure. FIG. 3C illustrates a top perspective view of the coin resistant gate 114 coupled to the card chip reader 110 in accordance with embodiments of the present disclosure. FIG. 3D illustrates a side view of the coin resistant gate 114 coupled to the card chip reader 110 in accordance with embodiments of the present disclosure. FIG. 3E illustrates a front perspective view of the coin resistant gate 114 coupled to the card chip reader 110 in accordance with embodiments of the present disclosure. FIG. 3F illustrates a top view of the coin resistant gate 114 separate from the card chip reader 110 in accordance with embodiments of the present disclosure. FIG. 3G illustrates a side view of the coin resistant gate 114 in accordance with embodiments of the present disclosure. Coin resistant gates can come in a wide variety of configurations, and FIGS. 3A-3G do not limit the scope of this disclosure to any particular implementation of a coin resistant gate.

The coin resistant gate 114 includes a plurality of angled protruding members or activation ribs 302 in the card path. In the example illustrated in FIGS. 3A-3G, the coin resistant gate 114 includes an activation rib 302 on a first side of the card slot 112 and an activation rib 302 on a second side of the card slot 112. The angled activation ribs 302 are operable to move the coin resistant gate 114 from a closed position to an open position upon a valid card insertion. Due to the circular shape and the size of a coin, the coin 202 is unable to interact with the ribs. The center of the coin resistant gate 114 is perpendicular to the entry path, such that a coin is not able push the gate 114 down when it encounters this area. The activation ribs 302 are operable for card insertion and coin rejection. A plurality of ribs 302 are included having perpendicular wall geometry to provide that a card makes contact and thus opens the gate 114. The angle of the activation ribs 302 and the inclusion of more than one activation rib 302 allow for a more robust card detection method, as the activation ribs 302 are difficult for coins to interact with, but are disposed such that a card can touch and open the gate 114. If a gate included one rib on one side, it is possible that the card could miss the rib, and thus would not open the gate. The coin resistant gate 114 disclosed herein removes that possibility by adding a second rib on the other side and having perpendicular wall geometry, allowing for the card to be detected, and the coin resistant gate lowered, regardless of how a user insets a payment card.

Figure 4A:
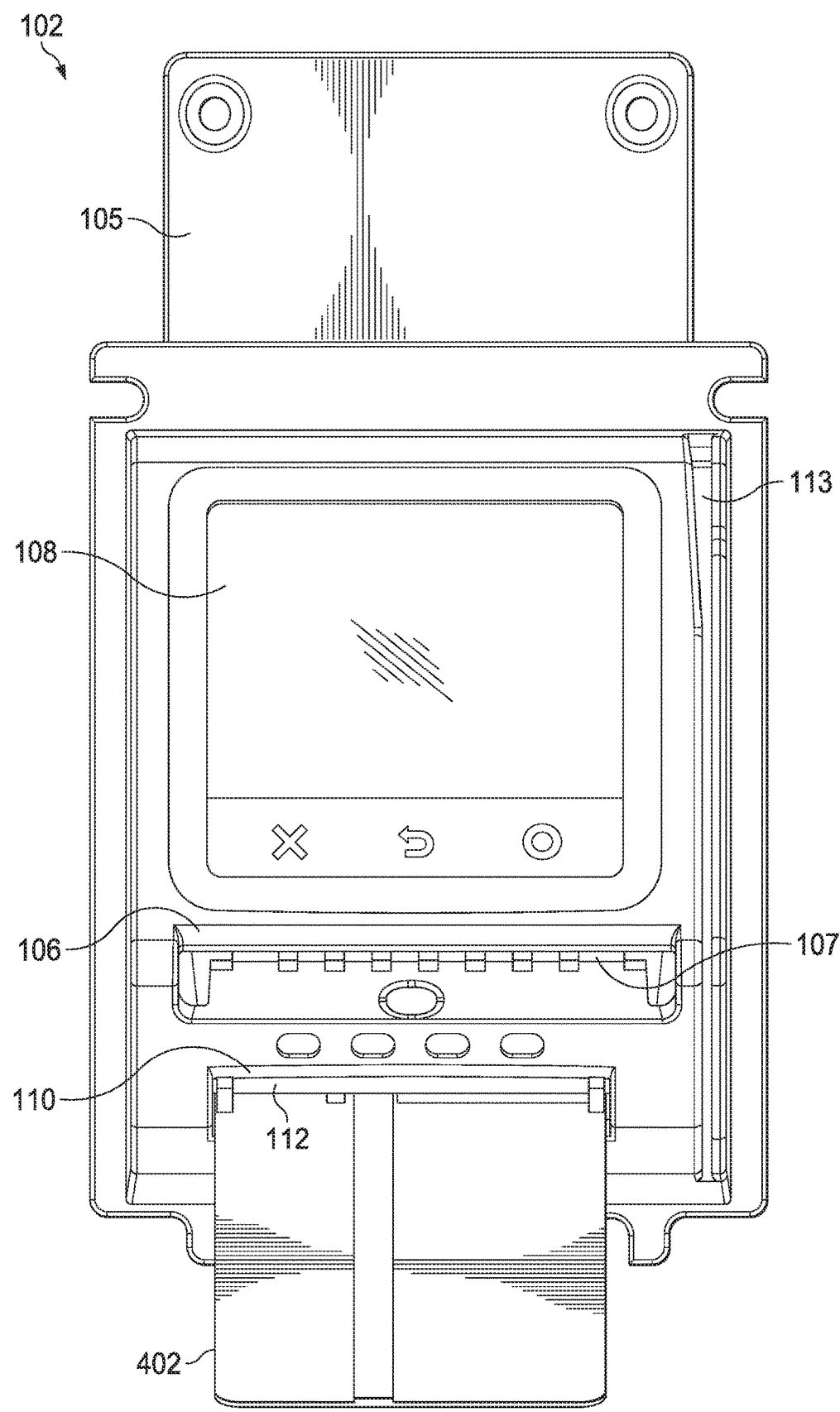
FIG. 4A is a front view of a payment bezel including a card to be inserted into a card slot in accordance with embodiments of the present disclosure.
Figure 4B:
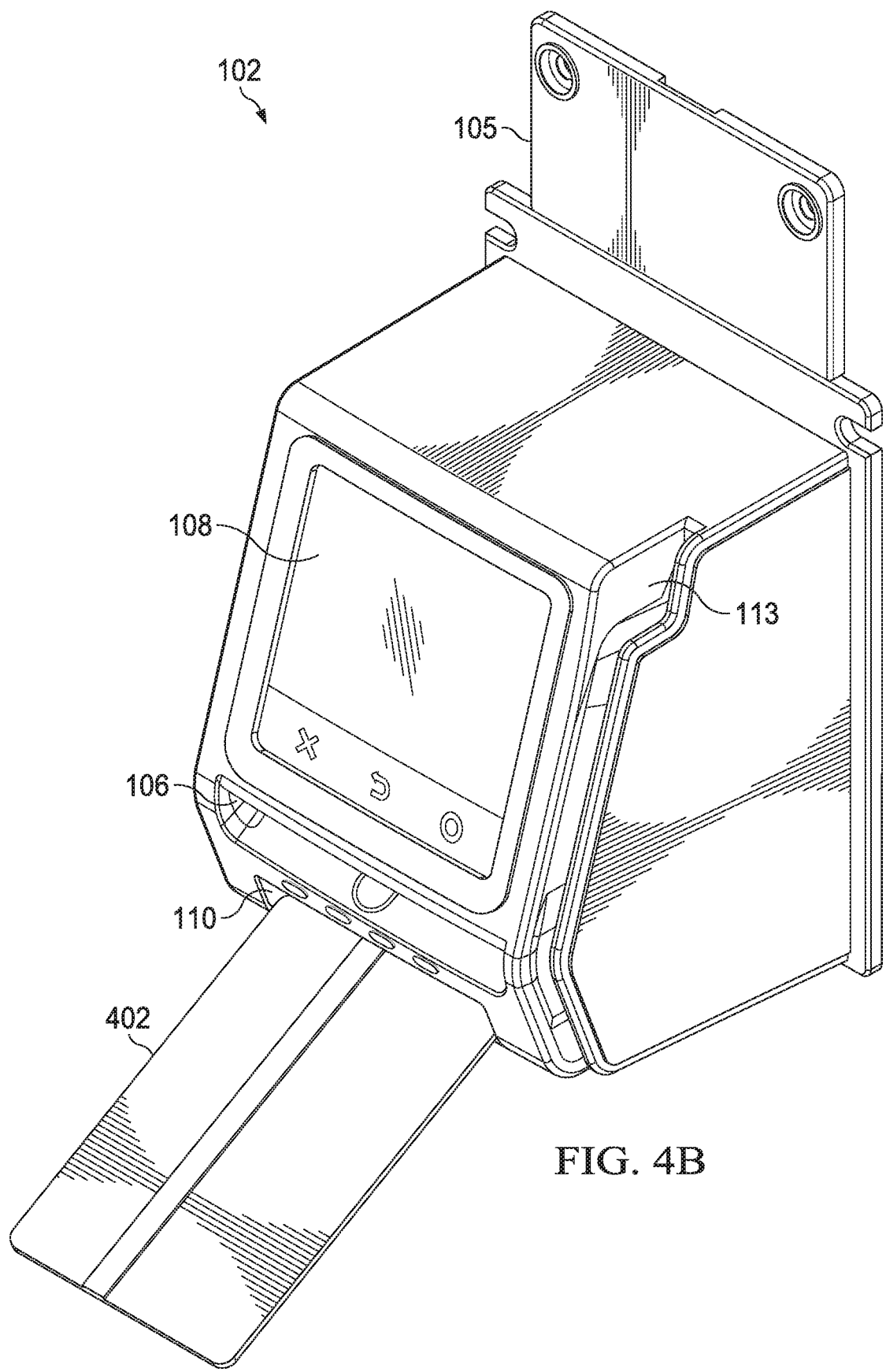
FIG. 4B is a side perspective view of a payment bezel including a card to be inserted into a card slot in accordance with embodiments of the present disclosure.
Figure 4C:
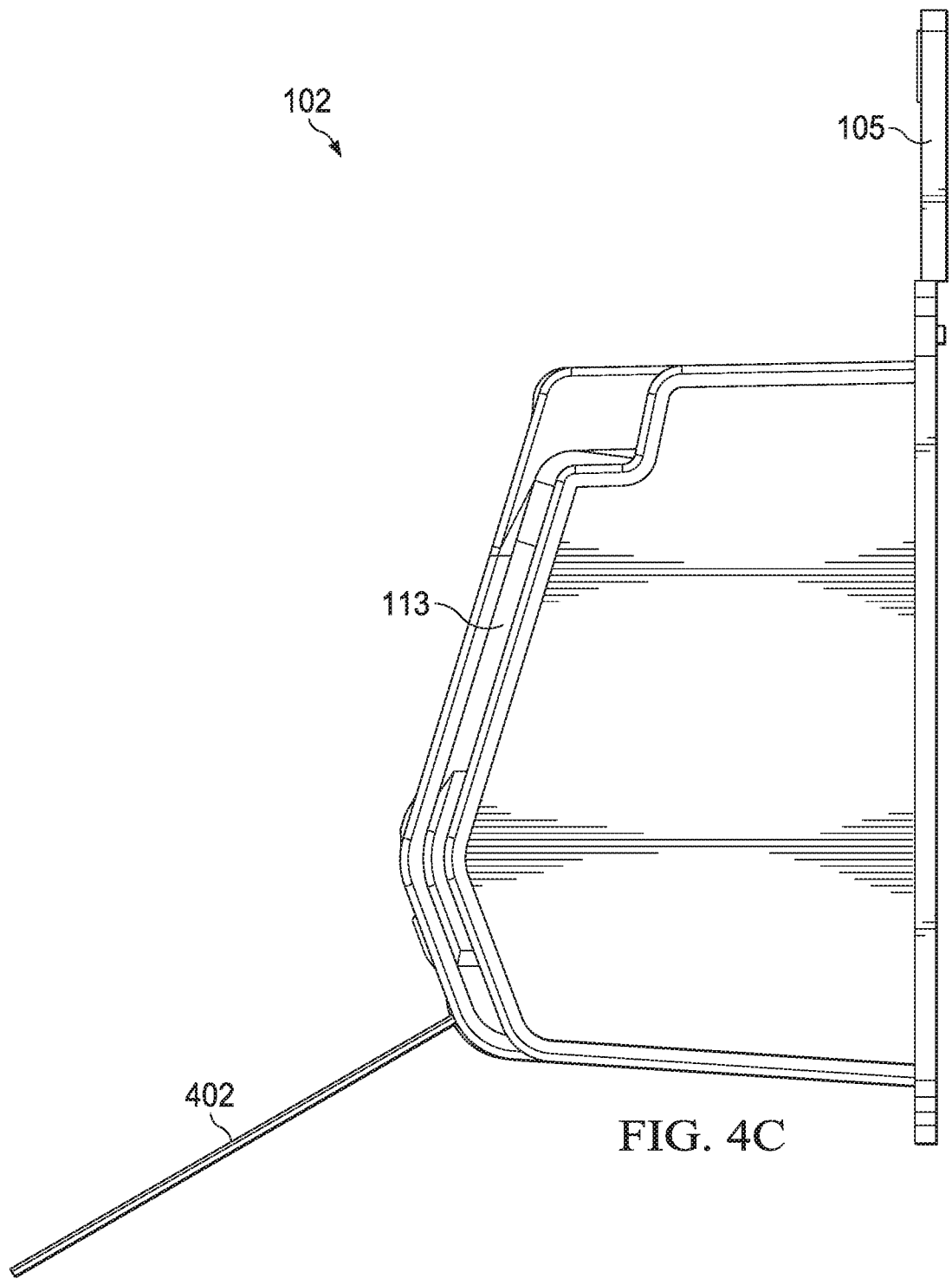
FIG. 4C is a side view of a payment bezel including a card to be inserted into a card slot in accordance with embodiments of the present disclosure.
Figure 4D:
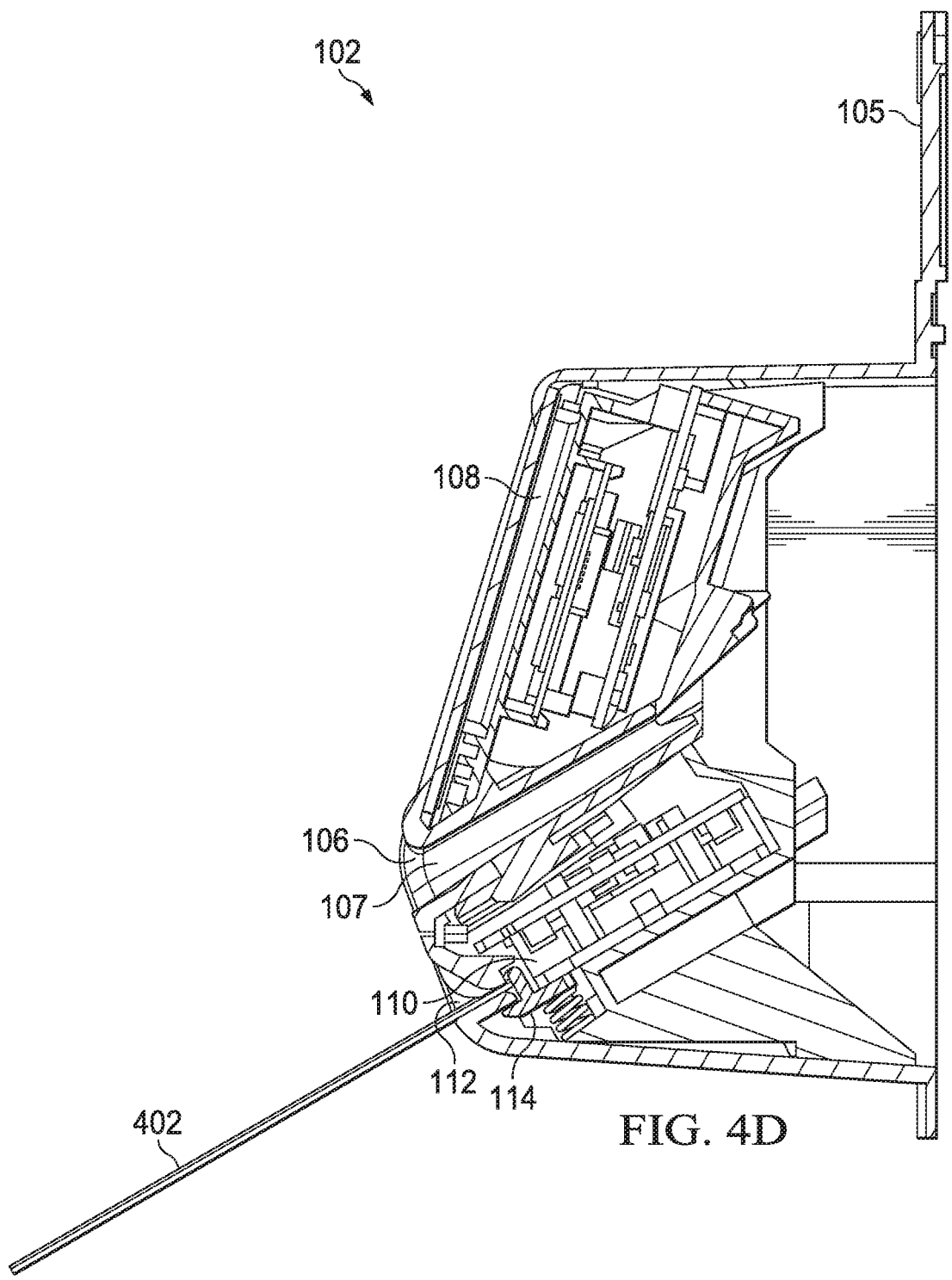
FIG. 4D is a side cross-sectional view of a payment bezel showing internal components of a payment bezel including a card to be inserted into a card slot in accordance with embodiments of the present disclosure.

FIGS. 4A-4D illustrate various views of the payment bezel 102 including a payment card 402 inserted into the card slot 112 of the card chip reader 110 in accordance with embodiments of the present disclosure. FIG. 4A is a front view of the payment bezel 102 including the payment card 402 inserted into the card slot 112 of the card chip reader 110 in accordance with embodiments of the present disclosure. FIG. 4B is a side perspective view of the payment bezel 102 including the payment card 402 inserted into the card slot 112 of the card chip reader 110 in accordance with embodiments of the present disclosure. FIG. 4C is a side view of the payment bezel 102 including the payment card 402 inserted into the card slot 112 of the card chip reader 110 in accordance with embodiments of the present disclosure. FIG. 4D is a side cross-sectional view of the payment bezel 102 including the payment card 402 inserted into the card slot 112 of the card chip reader 110 in accordance with embodiments of the present disclosure. Payment bezels can come in a wide variety of configurations, and FIGS. 4A-4D do not limit the scope of this disclosure to any particular implementation of a payment bezel.

As described with respect to FIGS. 3A-3G, the coin resistant gate 114 includes two angled activation ribs 302, operable for card insertion and coin rejection, in the card path on the left and right sides of the card slot 112. The angled activation ribs 302 allow the coin resistant gate 114 to open upon a valid card insertion. A center portion of the coin resistant gate 114 is perpendicular to the entry path, such that a coin is not able push the gate 114 down when it encounters this area. The activation ribs 302 are operable for card insertion and coin rejection. The angle of the ribs 302 and the inclusion of a second rib allow for a more robust card detection method, as the ribs 302 are difficult for coins to interact with, but allow for a card to touch and open the gate 114. The angled activation ribs 302 allow cards to trigger the ribs 302 while also rejecting coins and preventing coins from lowering the coin resistant gate 114. As shown in FIGS. 4A-4D, the activation ribs 302 interact with the card to open the coin resistant gate so that the payment card 402 can be inserted into the slot 112, the card slot including dimensions allowing for a payment card to be inserted, to complete a purchase or other transaction.

Figure 5A:
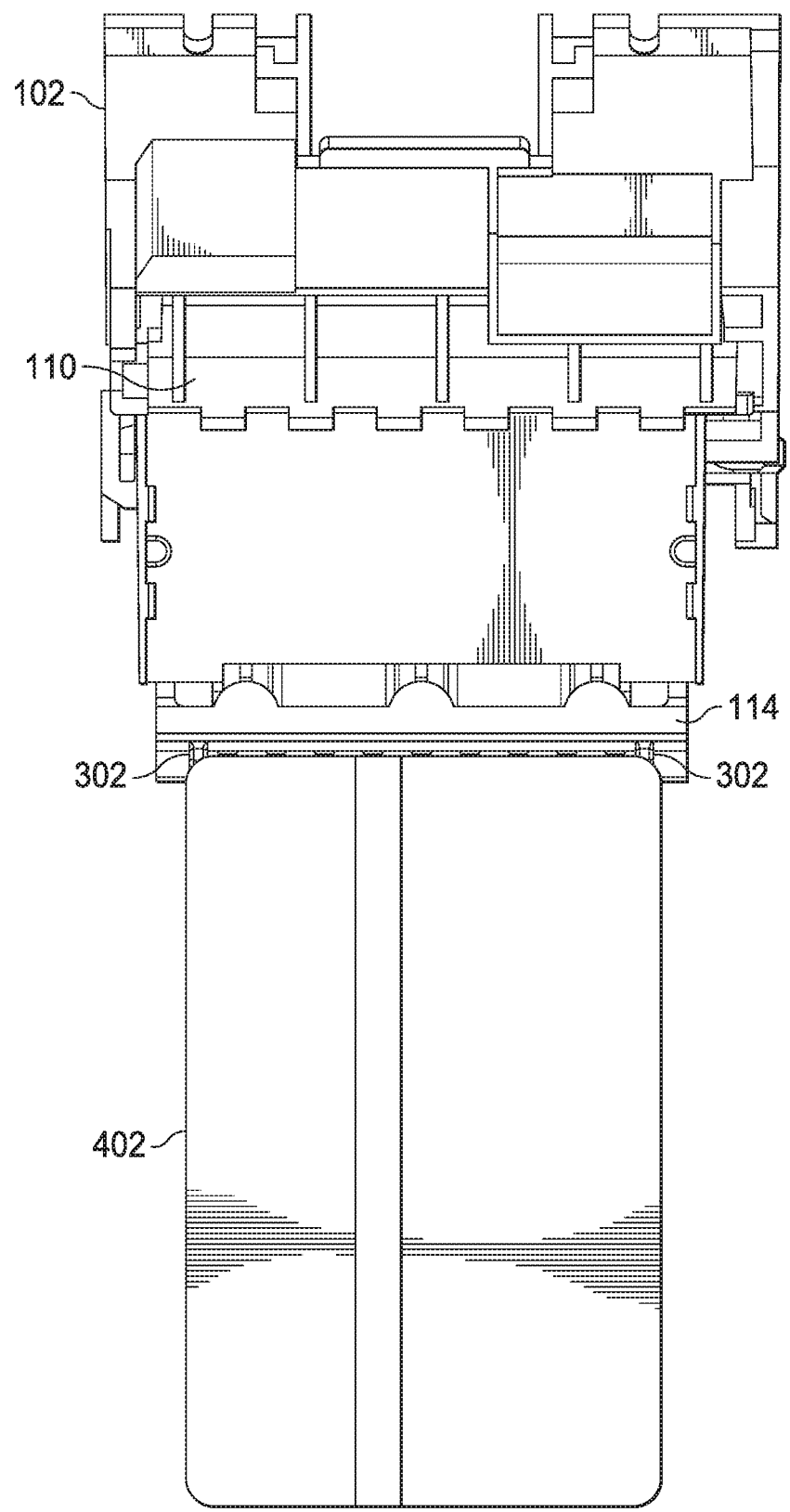
FIG. 5A illustrates a front perspective view of a coin resistant gate coming into contact with a payment card in accordance with embodiments of the present disclosure.
Figure 5B:
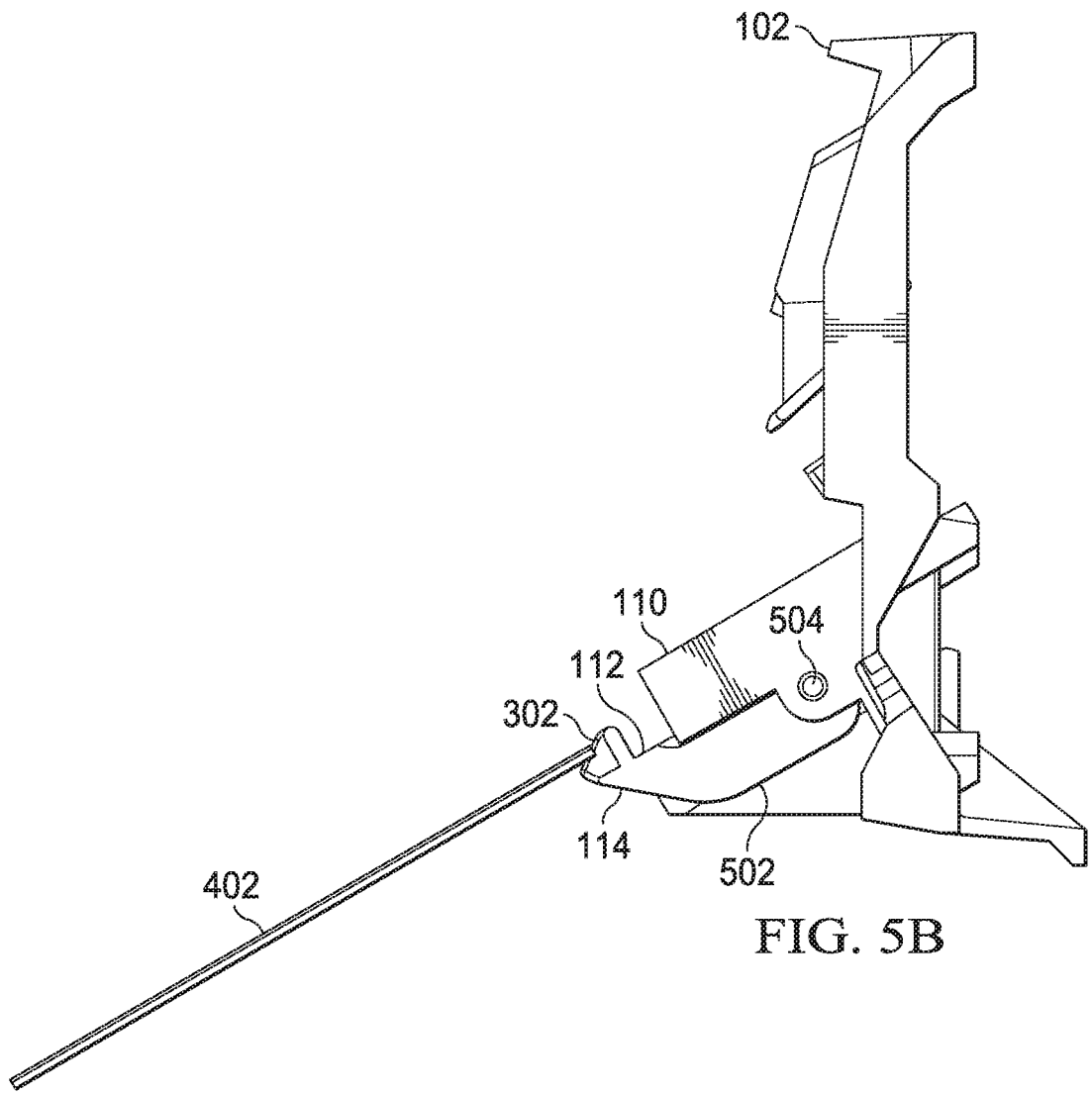
FIG. 5B illustrates a side view of a coin resistant gate coming into contact with a payment card in accordance with embodiments of the present disclosure.

FIGS. 5A-5C illustrate various views of the coin resistant gate 114 coming into contact with a payment card 402 in accordance with embodiments of the present disclosure. FIG. 5A illustrates a front perspective view of the coin resistant gate 114 coming into contact with the payment card 402 in accordance with embodiments of the present disclosure. FIG. 5B illustrates a side view of the coin resistant gate 114 coming into contact with the payment card 402 in accordance with embodiments of the present disclosure. FIG. 5C illustrates a top perspective view of the coin resistant gate 114 coming into contact with the payment card 402 in accordance with embodiments of the present disclosure. Coin resistant gates can come in a wide variety of configurations, and FIGS. 5A-5C do not limit the scope of this disclosure to any particular implementation of a coin resistant gate.

As described with respect to FIGS. 3A-3G, the coin resistant gate 114 includes two angled activation ribs 302, operable for card insertion and coin rejection, in the card path on the left and right sides of the card slot 112. The angled activation ribs 302 allow the coin resistant gate 114 to open upon a valid card insertion. A center portion of the coin resistant gate 114 is perpendicular to the entry path, such that a coin is not able push the gate 114 down when it encounters this area. The activation ribs 302 are operable for card insertion and coin rejection. The angle of the ribs 302 and the inclusion of a second rib allow for a more robust card detection method, as the ribs 302 are difficult for coins to interact with, but allow for a card to touch and open the gate 114. If the gate 114 included one rib on one side, it is possible that the payment card 402 could miss the rib, and thus would not open the gate 114. The coin resistant gate 114 disclosed herein removes that possibility by adding a second rib on the other side and having perpendicular wall geometry, allowing for the card to be detected and the coin resistant gate 114 lowered regardless of how a user insets a payment card. The angled activation ribs 302 allow cards to trigger the ribs 302 while also rejecting coins and preventing coins from lowering the coin resistant gate 114.

The coin resistant gate 114 further includes a body 502 moveably connected to an interior of the payment bezel 102, and/or to the card chip reader 110. In some embodiments, the body 502 is rotatably connected to the interior of the payment bezel 102 by a hinge 504. In some embodiments, the body 502 is slidably connected to the interior of the payment bezel 102 by a sliding element, such as a pin and slot configuration. When the payment card 402 is inserted into the card slot 112 of the card chip reader 110, a front edge of the payment card 402 contacts the activation ribs 302 on each side of the card path, which causes the coin resistant gate 114 to rotate and open, allowing the payment card 402 to enter the card chip reader 110 so that the payment card 402 can be read by the card chip reader 110 to complete a transaction.

Figure 6A:
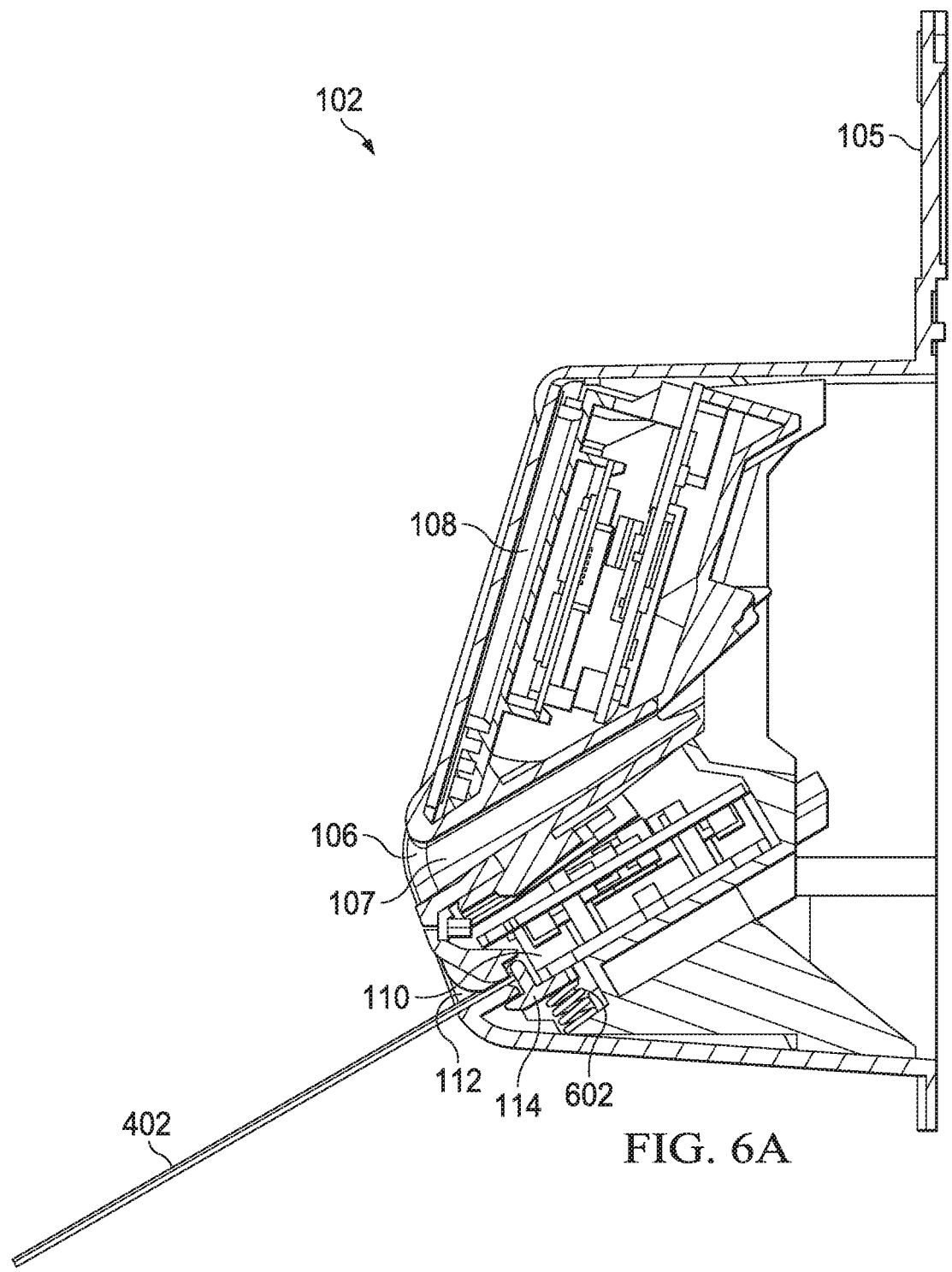
FIG. 6A illustrates a side cross-sectional view of a payment bezel showing a coin resistant gate and a payment card inserted in a coin slot in accordance with embodiments of the present disclosure.
Figure 6B:
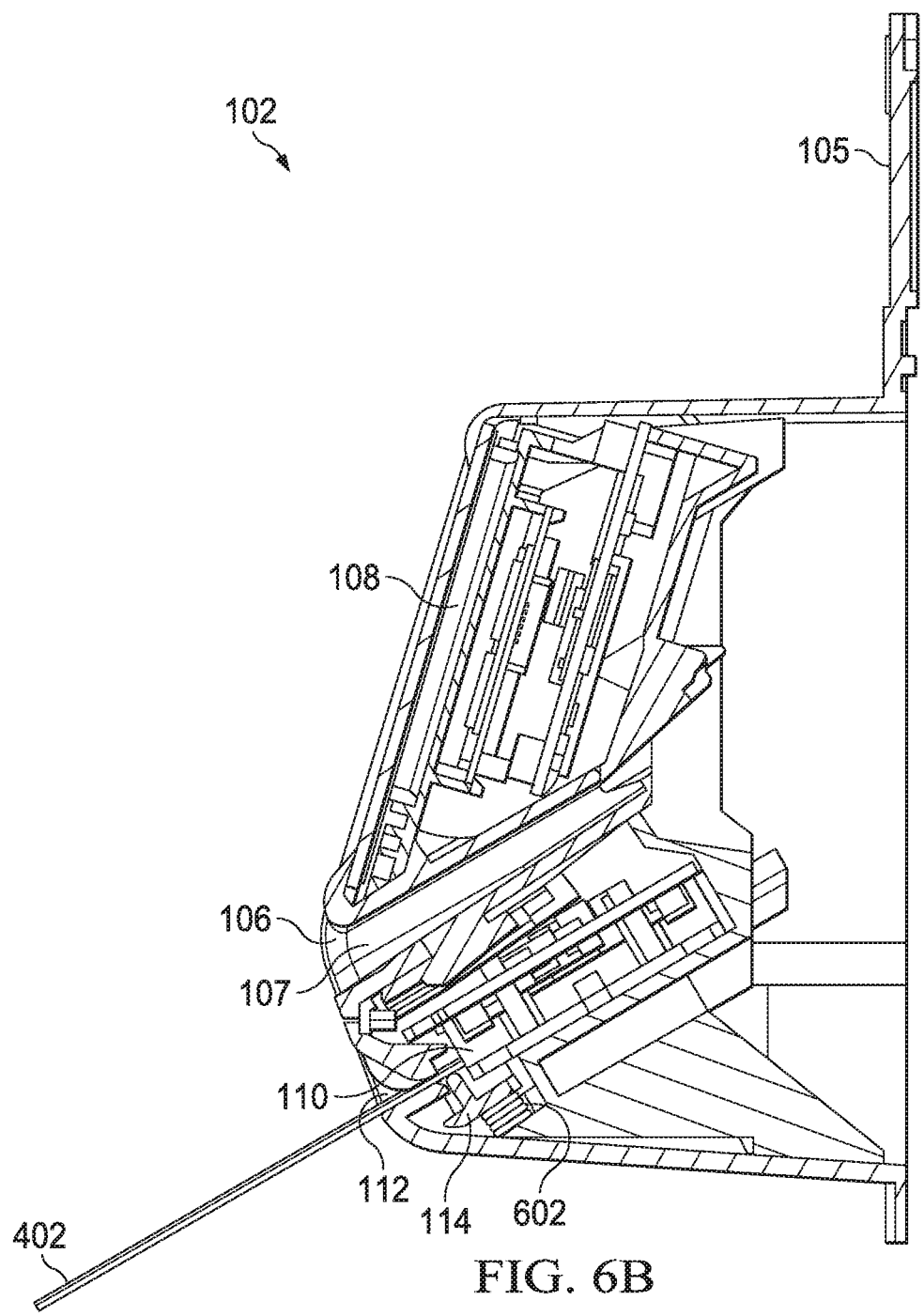
FIG. 6B illustrates a side cross-sectional view of a payment bezel showing a coin resistant gate and a payment card passing through a coin resistant gate in accordance with embodiments of the present disclosure.

FIGS. 6A-6C illustrate various views of the payment bezel 102 and coin resistant gate 114 in accordance with embodiments of the present disclosure. FIG. 6A illustrates a side cross-sectional view of the payment bezel 102 showing the coin resistant gate 114 and a payment card 402 inserted in the card slot 112 in accordance with embodiments of the present disclosure. FIG. 6B illustrates a side cross-sectional view of the payment bezel 102 showing the coin resistant gate 114 and a payment card 402 passing through the coin resistant gate 114 in accordance with embodiments of the present disclosure. FIG. 6C illustrates a top view of the coin resistant gate 114 showing elastic member locations 604 in accordance with embodiments of the present disclosure. Payment bezels and coin resistant gates can come in a wide variety of configurations, and FIGS. 6A-6C do not limit the scope of this disclosure to any particular implementation of a payment bezel or coin resistant gate.

When the payment card 402 encounters the activation ribs 302 of the coin resistant gate 114, the coin resistant gate 114 rotates and opens, allowing the payment card 402 to be inserted within the card chip reader 110 so that the card chip reader 110 can read the data from a chip on the payment card 402, as shown in FIGS. 6A and 6B. As the slot 112 and coin resistant gate 114 have a horizontal orientation, as opposed to a vertical orientation, gravity does not assist with preventing coins from being inserted into the card slot 112. The coin resistant gate 114 thus includes elastic member 602 to force or press the gate 114 closed when a card is not inserted into the card slot 112, which decreases the likelihood that the gate 114 is forced open by objects other than a payment card. In some embodiments, the elastic members can be springs. When the payment card 402 contacts the activation ribs 302, pressure on the coin resistant gate 114 causes the elastic members 602 to compress, allowing the coin resistant gate 114 to rotate and move toward a bottom portion of the payment bezel 102 and out of the path of the payment card 402 entering the slot 112.

As shown in FIG. 6C, in some embodiments, three elastic member locations 604 for elastic members to be placed can be present on the coin resistant gate 114, to allow for multiple elastic members 602 to be installed on the coin resistant gate 114. In some embodiments, the elastic members 602 are disposed adjacently below the activation ribs 302, increasing the force holding the gate 114 closed, and further decreasing the likelihood of other objects forcing the gate open. In some embodiments, the elastic member locations 604 are arranged across a length of the coin resistant gate 114, such as shown in FIG. 6C, to allow for pressure from the elastic members 602 disposed in the elastic member locations 604 to be distributed across the length of the coin resistant gate 114. Including multiple elastic member-holding locations 604, such as three elastic member-holding locations, provides for additional closing strength. This reduces the chance that a coin forced into the entrance could shift the gate 114. It also allows for the elastic members 602 to be placed over or below the activation ribs 302.

Figure 7A:
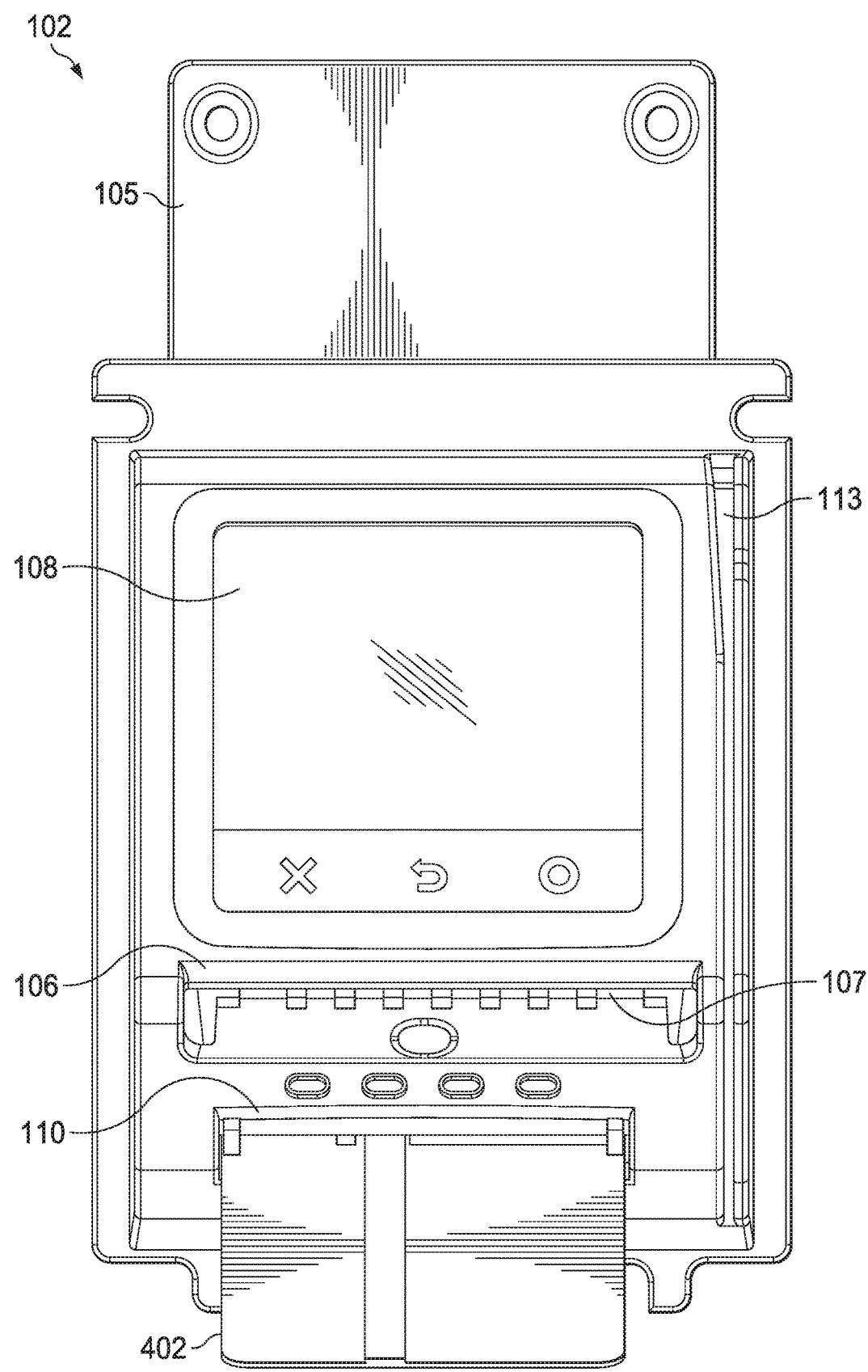
FIG. 7A is a front view of a payment bezel including a card fully inserted into a card slot in accordance with embodiments of the present disclosure.
Figure 7B:
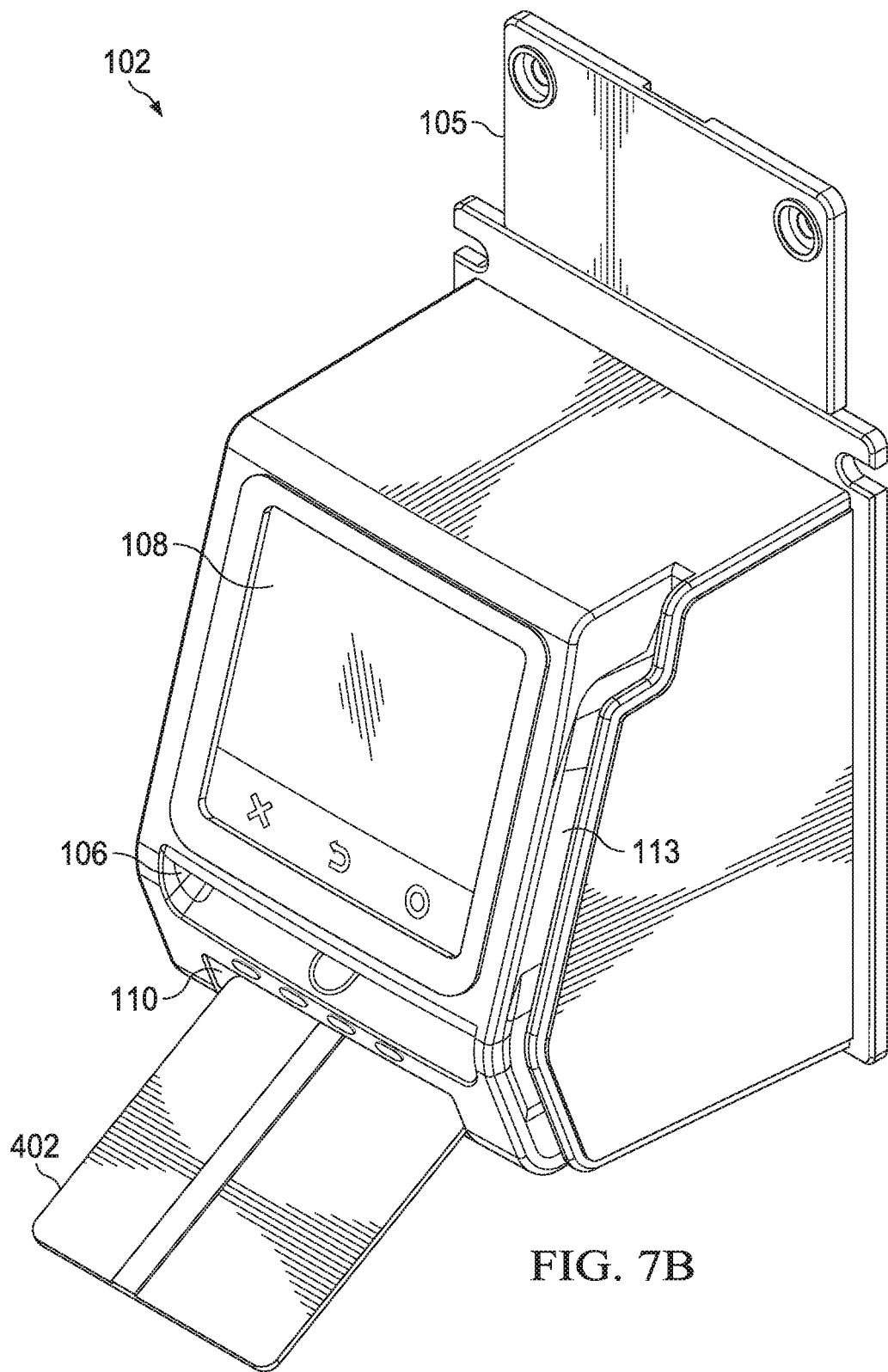
FIG. 7B is a side perspective view of a payment bezel including a card fully inserted into a card slot in accordance with embodiments of the present disclosure.
Figure 7C:
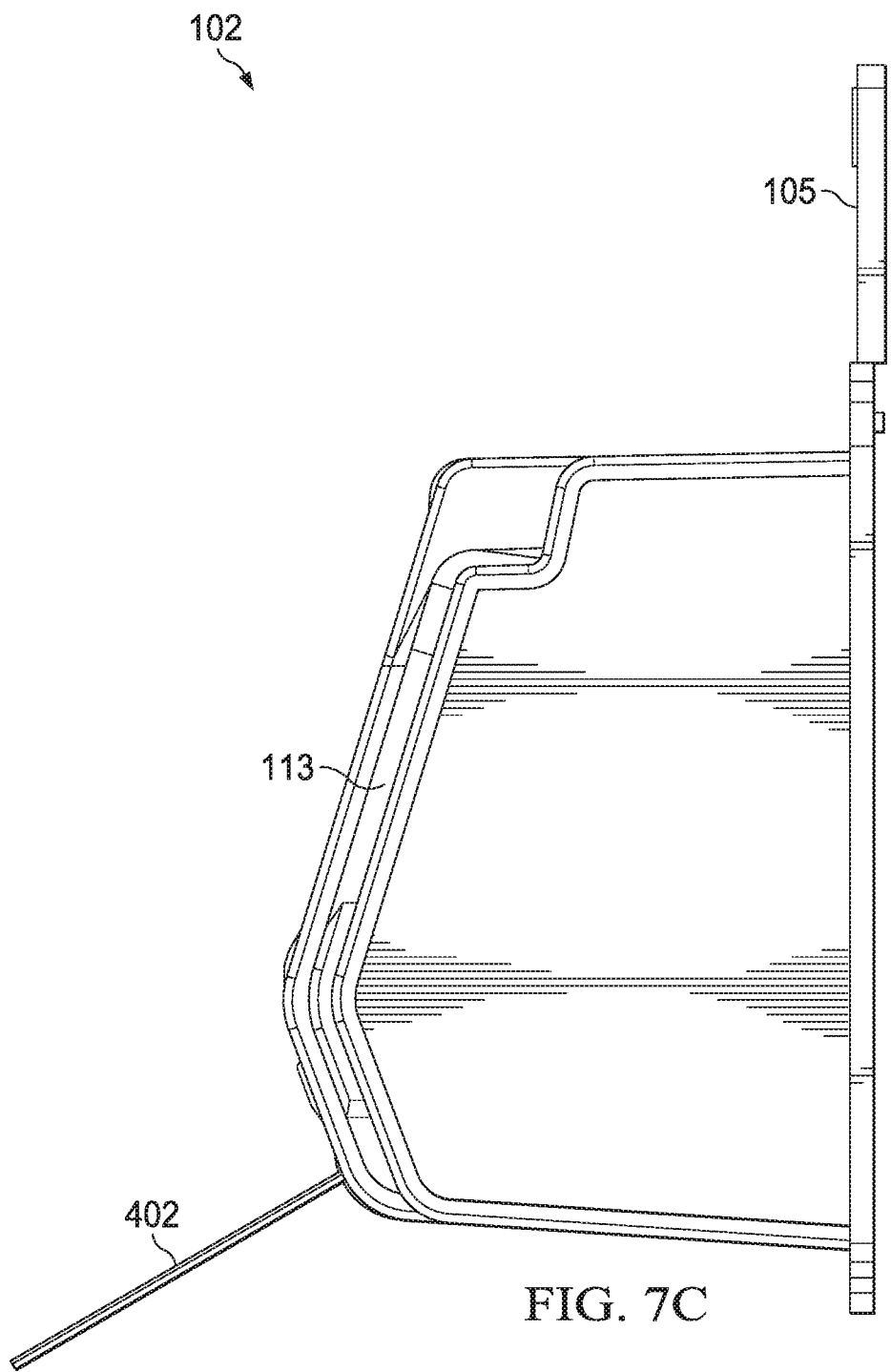
FIG. 7C is a side view of a payment bezel including a card fully inserted into a card slot in accordance with embodiments of the present disclosure.
Figure 7D:
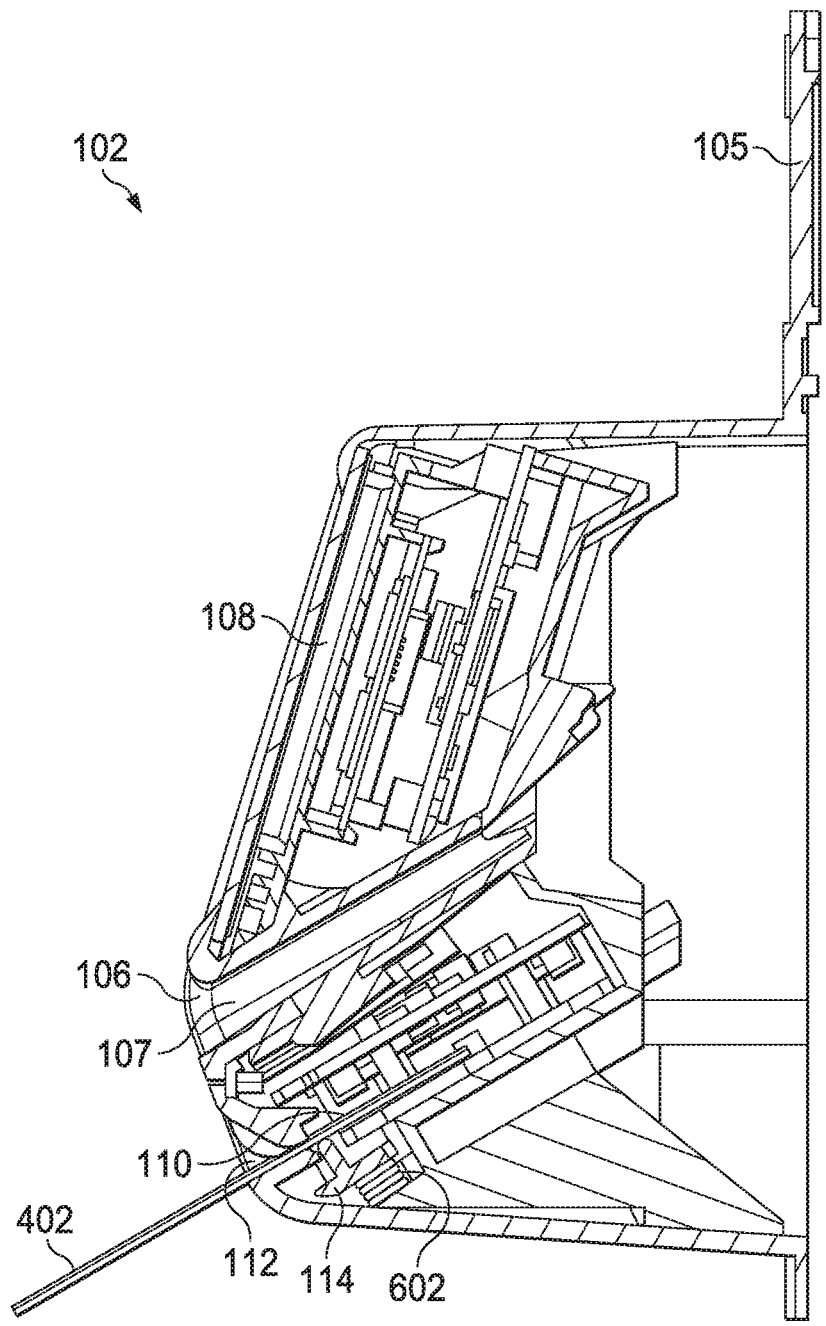
FIG. 7D is a side cross-section view of a payment bezel of a payment bezel including a card fully inserted into a card slot in accordance with embodiments of the present disclosure.
Figure 7E:
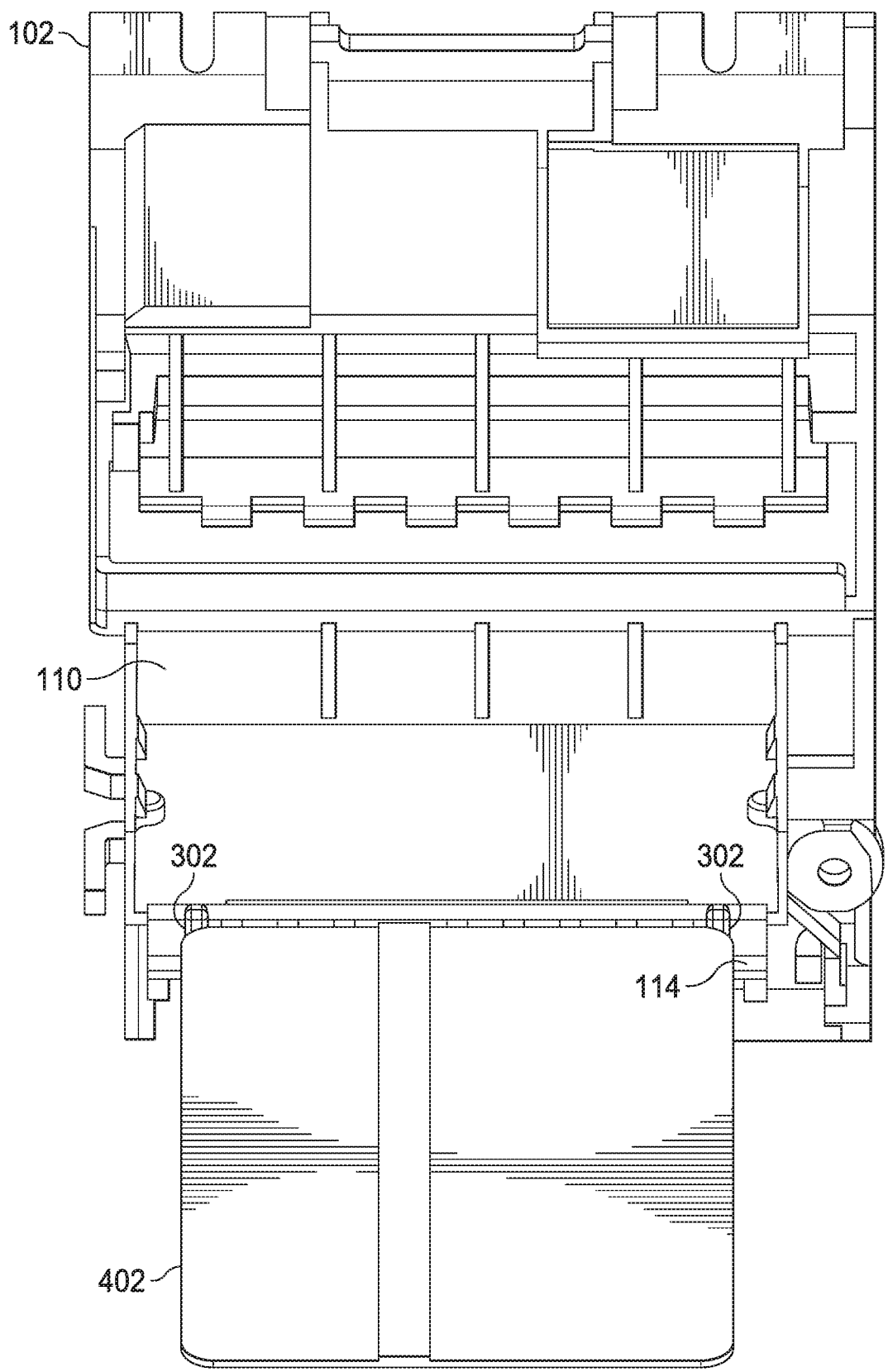
FIG. 7E is a top perspective view of a coin resistant gate of a payment bezel including a card fully inserted into a card slot in accordance with embodiments of the present disclosure.

FIGS. 7A-7E illustrate various views of the payment bezel 102 including a payment card 402 fully inserted into the card slot 112 in accordance with embodiments of the present disclosure. FIG. 7A is a front view of the payment bezel 102 including the payment card 402 fully inserted into the card slot 112 in accordance with embodiments of the present disclosure. FIG. 7B is a side perspective view of the payment bezel 102 including the payment card 402 fully inserted into the card slot 112 in accordance with embodiments of the present disclosure. FIG. 7C is a side view of the payment bezel 102 including the payment card 402 fully inserted into the card slot 112 in accordance with embodiments of the present disclosure. FIG. 7D is a side cross-section view of the payment bezel 102 including the payment card 402 fully inserted into the card slot 112 in accordance with embodiments of the present disclosure. FIG. 7E is a top perspective view of the coin resistant gate 114 of the payment bezel 102 including the payment card 402 fully inserted into the card slot 112 in accordance with embodiments of the present disclosure. Payment bezels and coin resistant gates can come in a wide variety of configurations, and FIGS. 7A-7E do not limit the scope of this disclosure to any particular implementation of a payment bezel or a coin resistant gate.

As shown in FIGS. 7A-7E, when the payment card 402 contacts the activation ribs 302, pressure on the coin resistant gate 114 causes the elastic members 602 to compress, allowing the coin resistant gate 114 to rotate and move toward a bottom portion of the payment bezel 102 and out of the path of the payment card 402 entering the slot 112. The payment card 402 can then be fully inserted into the card slot 112. The card chip reader 110 comes into communicative contact with the chip on the payment card 402 to read card data from the chip in order to complete a purchase or other transaction.

Figure 8:
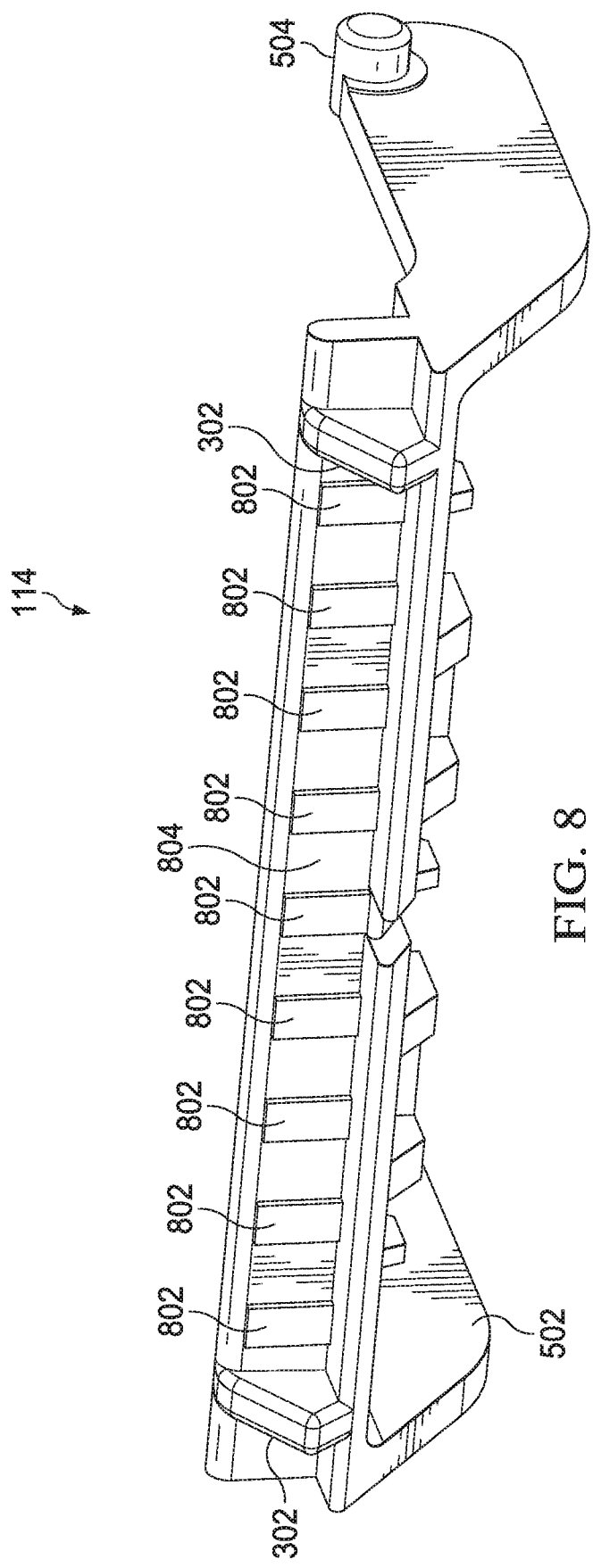
FIG. 8 illustrates a front perspective view of a coin resistant gate in accordance with embodiments of the present disclosure.

FIG. 8 illustrates a front perspective view of the coin resistant gate 114 in accordance with embodiments of the present disclosure. Coin resistant gates can come in a wide variety of configurations, and FIG. 8 does not limit the scope of this disclosure to any particular implementation of a coin resistant gate.

In some situations, the insertion area such as card slot 112 for a payment card included on payment devices may be difficult to identify for a customer. For example, poor lighting in a location in which a payment apparatus including a card reader is disposed can cause difficulty in users ascertaining the position of the card slot 112. A payment device such as payment bezel 102 can also include multiple sections for providing different interactions, such as a coin slot, a banknote slot, change dispensing areas, personal identification number (PIN) entry devices, or other sections. Payment devices may also include gates that have not been designed to absorb and volumetrically spread light. Instead, these other gates may include a solid opaque material and a geometry that does not allow for optimized illumination.

As illustrated in FIG. 8, the coin resistant gate 114 includes a series of vertical protruding members or vertical ribs 802 across a front surface 804 of the coin resistant gate 114. The vertical ribs 802 can be spaced in a uniform manner such that each of the vertical ribs 802 is spaced at a predefined distance from another vertical rib 802. The front surface 804 and/or the vertical ribs 802 include a resin or edge glow material that illuminates with light, such as ultraviolet (UV) light. In some embodiments, the vertical ribs 802 spread the light evenly across the front of the coin resistant gate 114. In some embodiments, the coin resistant gate 114 of the present disclosure is operable to absorb light from a UV light-emitting diode (LED) positioned near or adjacent the coin resistant gate 114 within the payment bezel 102 or the currency handling apparatus 100, such as behind or in front of the coin resistant gate 114. The contact insertion area or card slot 112 of the card chip reader 110 can thus be individually illuminated to guide the customer to the proper insertion area for a payment card.

One example embodiment of the present disclosure includes a coin resistant gate for a payment interface. The coin resistant gate comprises a body moveably connected within the payment interface, a front surface connected to the body, the front surface operable to prevent objects from entering the payment interface, and two or more protruding members connected to the front surface, the two or more protruding members for interacting with a payment card, wherein, upon an interaction between the two or more protruding members and a payment card, the body moves to allow the payment card to pass the front surface of the body of the coin resistant gate.

In one or more of the above examples, the body is supported by one or more elastic members disposed in an interior of the payment interface.

In one or more of the above examples, the one or more elastic members are operable to press the body into a closed position.

In one or more of the above examples, when in the closed position, the front surface of the body covers a card slot of a card chip reader device included in the payment interface.

In one or more of the above examples, upon the interaction between the two or more protruding members and the payment card, the one or more elastic members compress to allow the body to move.

In one or more of the above examples, movement of the body upon interaction between the two or more protruding members and the payment card includes movement of the body from the closed position to an open position.

In one or more of the above examples, movement of the body to the open position is operable to allow the payment card to communicatively contact a card chip reader.

In one or more of the above examples, the one or more elastic members include two elastic members, and wherein each of the two elastic members is disposed adjacent one of the protruding members.

In one or more of the above examples, the one or more elastic members include more than two elastic members arranged across a length of the coin resistant gate.

In one or more of the above examples, the coin resistant gate further comprises a plurality of ribs disposed on the front surface of the body.

In one or more of the above examples, at least one of the plurality of ribs or the front surface of the body includes a glow material operable to absorb light to illuminate a payment insertion area of the payment interface.

In one or more of the above examples, each of the plurality of ribs is spaced at a predefined distance from another one of the plurality of ribs.

In one or more of the above examples, the payment interface includes a light-emitting diode (LED) disposed adjacent the coin resistant gate of the payment interface, wherein the LED is operable to provide at least a portion of the light absorbed by the glow material.

In one or more of the above examples, the LED is disposed behind the coin resistant gate in an interior of the payment interface.

In one or more of the above examples, the body is rotatably connected within the payment interface by a hinge coupled to an interior of the payment interface.

One example embodiment of the present disclosure includes a method of operating a coin resistant gate in a payment interface. The method comprises inserting an object inside a payment insertion area of the payment interface, wherein the inserted object interacts with two or more protruding members connected to a front surface of the coin resistant gate, and wherein the front surface operates to prevent objects from entering the payment interface, and moving the coin resistant gate to allow the inserted object to pass the front surface if two or more protruding members interact with the inserted object.

In one or more of the above examples, the method further comprises imparting force on elastic members connected to the two or more protruding members, wherein the force moves the coin resistant gate to allow the inserted object to pass the front surface if two or more protruding members interact with the inserted object.

In one or more of the above examples, the method further comprises illuminating the coin resistant gate by at least a light-emitting diode (LED) disposed behind the coin resistant gate, wherein the front surface of the coin resistant gate includes glow material operable to absorb light to illuminate the payment insertion area of the payment interface.

In one or more of the above examples, the method further comprises imparting force on elastic members connected to the coin resistant gate to prevent the inserted object to pass the front surface if less than two protruding members interact with the inserted object.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A coin resistant gate for a payment interface, the coin resistant gate comprising:
   a body moveably connected within the payment interface;
   a front surface connected to the body, the front surface operable to prevent objects from entering the payment interface;
   a plurality of elastic members supporting the body, wherein the plurality of elastic members is disposed in an interior of the payment interface, and wherein the plurality of elastic members is arranged across a length of the coin resistant gate partially within indented elastic member locations of the body to bias the body upwardly relative to an opening of the coin resistant gate, wherein the plurality of elastic members include an elastic member disposed at a center portion of the body, and wherein pressure from the plurality of elastic members is distributed across the length of the coin resistant gate;
   two or more protruding members connected to the front surface, the two or more protruding members for interacting with a payment card; and
   a plurality of ribs disposed on the front surface of the body between the two or more protruding members,
   wherein, upon an interaction of the payment card with the two or more protruding members, the plurality of elastic members compress and the body moves to allow the payment card to pass the front surface of the body of the coin resistant gate,
   wherein the plurality of ribs on the front surface of the body includes a glow material operable to absorb light to illuminate a payment insertion area of the payment interface.

2. The coin resistant gate of claim 1, wherein the plurality of elastic members are operable to press the body into a closed position.

3. The coin resistant gate of claim 2, wherein, when in the closed position, the front surface of the body covers a card slot of a card chip reader device included in the payment interface.

4. The coin resistant gate of claim 3, wherein movement of the body upon the interaction of the payment card with the two or more protruding members includes movement of the body from the closed position to an open position.

5. The coin resistant gate of claim 4, wherein the movement of the body to the open position is operable to allow the payment card to communicatively contact a card chip reader.

6. The coin resistant gate of claim 2, wherein each of two of the plurality of elastic members is disposed adjacent one of the two or more protruding members.

7. The coin resistant gate of claim 1, wherein each of the plurality of ribs is spaced at a predefined distance from another one of the plurality of ribs.

8. The coin resistant gate of claim 1, wherein the payment interface includes a light-emitting diode (LED) disposed adjacent the coin resistant gate of the payment interface, wherein the LED is operable to provide at least a portion of the light absorbed by the glow material.

9. The coin resistant gate of claim 8, wherein the LED is disposed behind the coin resistant gate in the interior of the payment interface.

10. The coin resistant gate of claim 1, wherein the body is rotatably connected within the payment interface by a hinge coupled to the interior of the payment interface.

11. The coin resistant gate of claim 1, wherein the body is slidably connected within the payment interface by a slidable element coupled to the interior of the payment interface.

12. A method of operating a coin resistant gate in a payment interface, the method comprising:
- receiving an object inserted into a payment insertion area of the payment interface, wherein the inserted object interacts with two or more protruding members connected to a front surface of the coin resistant gate, wherein the front surface of the coin resistant gate includes a plurality of ribs disposed between the two or more protruding members, and wherein the front surface operates to prevent objects from entering the payment interface;
- illuminating the coin resistant gate by at least a light-emitting diode (LED) disposed behind the coin resistant gate, wherein the plurality of ribs of the front surface of the coin resistant gate includes a glow material operable to absorb light to illuminate the payment insertion area of the payment interface; and
- moving the coin resistant gate to allow the inserted object to pass the front surface if the two or more protruding members interact with the inserted object, including receiving a force on a plurality of elastic members supporting the coin resistant gate,
- wherein the plurality of elastic members is disposed in an interior of the payment interface,
- wherein the plurality of elastic members is arranged across a length of the coin resistant gate partially within indented elastic member locations of the coin resistant gate to bias the coin resistant gate upwardly relative to an opening of the coin resistant gate,
- wherein the plurality of elastic members include an elastic member disposed at a center portion of the coin resistant gate,
- wherein pressure from the plurality of elastic members is distributed across the length of the coin resistant gate, and
- wherein the force moves the coin resistant gate to allow the inserted object to pass the front surface if the two or more protruding members interact with the inserted object.

13. The method of claim 12, further comprising:
- preventing the inserted object to pass the front surface if less than two protruding members interact with the inserted object.

\* \* \* \* \*